(12) United States Patent
Kendall et al.

(10) Patent No.: US 9,747,539 B1
(45) Date of Patent: Aug. 29, 2017

(54) ORGANIC LIGHT EMITTING DIODE ("OLED") TRAVEL CARD

(71) Applicant: Bank of America Corporation, Charlotte, NC (US)

(72) Inventors: Russell Kendall, Seattle, WA (US); Cameron Wadley, Waxhaw, NC (US); Willard H. Waldron, III, Charlotte, NC (US); Donald Joseph Cardinal, San Antonio, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/188,642

(22) Filed: Jun. 21, 2016

(51) Int. Cl.
*G06K 19/06* (2006.01)
*G06K 19/073* (2006.01)
*G07F 19/00* (2006.01)
*G06K 19/07* (2006.01)
*G06K 19/077* (2006.01)

(52) U.S. Cl.
CPC . *G06K 19/07381* (2013.01); *G06K 19/06037* (2013.01); *G06K 19/0704* (2013.01); *G06K 19/07705* (2013.01); *G06K 19/07722* (2013.01); *G07F 19/2055* (2013.01)

(58) Field of Classification Search
CPC ....... G06K 19/07381; G06K 19/06037; G06K 19/0704; G06K 19/07705; G06K 19/07722; G06K 19/2055
USPC ........................................ 235/487, 488, 492
See application file for complete search history.

(56) References Cited

U.S. PATENT DOCUMENTS

| | | | |
|---|---|---|---|
| 3,703,864 A | 11/1972 | Bradford | |
| 3,946,206 A | 3/1976 | Darjany | |
| 4,968,873 A * | 11/1990 | Dethloff | G06K 7/006 235/375 |
| 5,693,956 A | 12/1997 | Shi et al. | |
| 5,734,154 A | 3/1998 | Jachimowicz et al. | |
| 5,770,849 A | 6/1998 | Novis et al. | |
| 6,015,092 A | 1/2000 | Postlewaite et al. | |

(Continued)

FOREIGN PATENT DOCUMENTS

| | | |
|---|---|---|
| DE | 102009028991 | 8/2009 |
| EP | 0827066 | 7/1997 |
| WO | WO 2013131153 | 4/2012 |

OTHER PUBLICATIONS

Conor Gaffey, "World's Smallest Nano Chip will Double Processing Power of Smartphones," Jun. 9, 2015.

(Continued)

*Primary Examiner* — Paultep Savusdiphol
(74) *Attorney, Agent, or Firm* — Weiss & Arons LLP; Michael A. Springs, Esq.

(57) ABSTRACT

Aspects of the invention relate to a smart check that includes an OLED display. The smart check may store data associated with multiple purchasing instruments and utilize the OLED display to present sensitive data associated with a user selected purchasing instrument. In response to the selection, the smart check may transmit sensitive data associated with the selected purchasing instrument. The smart check may receive power when it is inserted into a card reader. Inserting the smart check into the card reader may launch an application stored on the smart check. The smart check may store a value. The value may be converted into a currency associated with a location of the smart check.

21 Claims, 16 Drawing Sheets

(56) References Cited

U.S. PATENT DOCUMENTS

| | | | |
|---|---|---|---|
| 6,173,899 B1 | 1/2001 | Rozin | |
| 6,394,343 B1* | 5/2002 | Berg | G06K 7/0008 |
| | | | 235/379 |
| 6,724,103 B2* | 4/2004 | Parrault | G06K 7/10178 |
| | | | 235/492 |
| 7,025,277 B2 | 4/2006 | Forrest et al. | |
| 7,270,276 B2 | 9/2007 | Vayssiere | |
| 7,360,682 B2 | 4/2008 | Shane et al. | |
| 7,360,691 B2* | 4/2008 | Takayama | G07F 7/0866 |
| | | | 235/380 |
| 7,523,856 B2 | 4/2009 | Block et al. | |
| 7,588,183 B2 | 9/2009 | Shane et al. | |
| 7,791,559 B2 | 9/2010 | Piasecki | |
| 7,814,016 B2 | 10/2010 | Pranger | |
| 7,856,116 B2 | 12/2010 | Rodriguez et al. | |
| 7,940,159 B2 | 5/2011 | Clemens et al. | |
| 7,992,789 B2 | 8/2011 | Borracci | |
| 8,237,068 B2 | 8/2012 | Szaikowski | |
| 8,276,823 B2 | 10/2012 | Chen | |
| 8,317,094 B2 | 11/2012 | Lehman | |
| 8,378,932 B2 | 2/2013 | Fein et al. | |
| 8,392,965 B2 | 3/2013 | Carter et al. | |
| 8,399,889 B2 | 3/2013 | Wu et al. | |
| 8,413,893 B2 | 4/2013 | Kim | |
| 8,471,782 B2 | 6/2013 | Muklashy et al. | |
| 8,479,981 B2* | 7/2013 | Carmichael | G06K 7/10079 |
| | | | 235/379 |
| 8,523,059 B1 | 9/2013 | Mullen et al. | |
| 8,540,151 B1 | 9/2013 | Snyder et al. | |
| 8,678,293 B2 | 3/2014 | Chen | |
| 8,756,680 B2 | 6/2014 | Shashidhar | |
| 8,810,816 B2 | 8/2014 | Fischer et al. | |
| 8,820,638 B1* | 9/2014 | Cotter | G06Q 40/02 |
| | | | 235/380 |
| 2003/0145205 A1* | 7/2003 | Sarcanin | G06Q 20/02 |
| | | | 713/172 |
| 2003/0208405 A1 | 11/2003 | Putman et al. | |
| 2005/0134461 A1 | 6/2005 | Gelbman et al. | |
| 2005/0173518 A1* | 8/2005 | Takayama | G07F 7/0866 |
| | | | 235/380 |
| 2006/0016884 A1 | 1/2006 | Block et al. | |
| 2006/0091223 A1* | 5/2006 | Zellner | G06K 19/06206 |
| | | | 235/492 |
| 2006/0131393 A1 | 6/2006 | Cok et al. | |
| 2006/0261174 A1* | 11/2006 | Zellner | G06K 19/06206 |
| | | | 235/492 |
| 2007/0273507 A1 | 11/2007 | Burchell et al. | |
| 2007/0279315 A1 | 12/2007 | Laves et al. | |
| 2008/0035736 A1 | 2/2008 | Tompkin et al. | |
| 2008/0158150 A1 | 7/2008 | Rossman et al. | |
| 2009/0039154 A1 | 2/2009 | Williams et al. | |
| 2010/0084476 A1* | 4/2010 | Zellner | G06K 19/06206 |
| | | | 235/492 |
| 2010/0260388 A1 | 10/2010 | Garrett et al. | |
| 2010/0302206 A1 | 12/2010 | Yu et al. | |
| 2011/0060640 A1 | 3/2011 | Thompson et al. | |
| 2011/0140841 A1 | 6/2011 | Bona et al. | |
| 2011/0178928 A1* | 7/2011 | Carmichael | G06K 7/10079 |
| | | | 705/44 |
| 2011/0241996 A1 | 10/2011 | Vesely | |
| 2012/0280924 A1 | 11/2012 | Kummer et al. | |
| 2013/0162594 A1 | 6/2013 | Paulsen et al. | |
| 2013/0221112 A1* | 8/2013 | Lai | G06K 19/07707 |
| | | | 235/492 |
| 2013/0232082 A1 | 9/2013 | Krawczewicz et al. | |
| 2014/0081729 A1 | 3/2014 | Ocher | |
| 2014/0093144 A1 | 4/2014 | Feekes | |
| 2014/0114861 A1 | 4/2014 | Mages et al. | |
| 2014/0172700 A1 | 6/2014 | Teuwen et al. | |
| 2014/0291406 A1 | 10/2014 | Ko | |
| 2014/0337957 A1* | 11/2014 | Feekes | H04L 63/0853 |
| | | | 726/9 |
| 2014/0353384 A1* | 12/2014 | Hoegerl | G06K 19/07707 |
| | | | 235/488 |
| 2015/0077646 A1 | 3/2015 | Chen et al. | |
| 2015/0262052 A1* | 9/2015 | Pahuja | G06Q 20/341 |
| | | | 340/10.52 |
| 2016/0004945 A1 | 1/2016 | Wade | |
| 2016/0054479 A1 | 2/2016 | Ho et al. | |
| 2016/0085325 A1 | 3/2016 | Lee et al. | |
| 2016/0171461 A1 | 6/2016 | Hoover et al. | |
| 2016/0210453 A1 | 7/2016 | Seo et al. | |

OTHER PUBLICATIONS http://www.us.schott.com/innovation/ultrathinglass/, Retrieved on Sep. 14, 2016.
"Schott's Reliable and Strong Ultra-Thin Glass Features in Fingerprint Sensors in new Smartphones," Retrieved on Sep. 14, 2016.
Ron Martens, "The OLED Handbook, A Guide to OLED Technology, Industry & Market," 2015 Edition.
Bryce Kellogg, Vamsi Talla, Shyamnath Gollakota and Joshua R. Smith, "Passive Wi-Fi: Bringing Low Power to Wi-Fi Transmissions," Retrieved on May 11, 2016.
Ron Mertens, SecureCard—A New Secure Credit Card Technology, Utilizing an OLED Display, Nov. 21, 2006, Metalgrass Software.
John Wehr, "Card Size Specifications: When Does Card Size Matter?" Jan. 1, 2002.
Zachary Shahan, "Ultra-Thin-Solar-Cell Company Unstealths, Aims to Cut Cost of Solar Cells in Half!" Mar. 14, 2012, Sustainable Enterprises Media, Inc.
"ISO Magnetic Stripe Card Standards," Retrieved on Jul. 18, 2016.
"Coin Vs. Plastic: Which Credit Card Consolidation Tool is the Best?" Retrieved on Apr. 7, 2016, PayProTec.
"Tiny Batteries Could Revolutionize Green Energy," Retrieved on Apr. 5, 2016, National Geographic Society.
"Yubikey 4 & Yubikey 4 Nano," Retrieved on Apr. 7, 2016, Yubico.
"Magnetic Stripe Card Standards," Retrieved on Apr. 20, 2016, MagTek Inc., Seal Beach, California.
"A Power-Harvesting Pad-Less mm-sized 24/60GHz Passive Radio With On-Chip Antennas," Retrieved on Apr. 19, 2016, IEEE.
"Magnetic Stripe Card Recommendations," Retrieved on Apr. 20, 2016.
"Plastic Card Manufacturing Including Magnetic Stripe Tapelaying," Retrieved on Apr. 20, 2016.
Paul Buckley, "Flexible OLED Displays Target Volume Production in 2015," Feb. 5, 2015.
"MAX2837—2.3GHz to 2.7GHz Wireless Broadband RF Transceiver," Retrieved on May 30, 2016, Maxim Integrated.
"Ultrathin Rechargeable Lithium Polymer Batteries from PowerStream," Apr. 5, 2016, Lund Instrument Engineering, Inc.
Tom Abate, "Stanford Engineers Aim to Connect the World with Ant-Sized Radios," Sep. 9, 2014, Stanford University, Stanford California.
http://www.schott.com/advanced_optics/english/syn/advanced_optics/products/wafers-and-thin-glass/glass-wafer-and-substrates/ultra-thin-glass/index.html, Retrieved on May 30, 2016.
Jennifer Langston, "UW Engineers Achieve Wi-Fi at 10,000 Times Lower Power," Feb. 23, 2016.
Ron Mertens, "New All-In-One Credit Card Concept," Oct. 29, 2009, Metalgrass Software.
"Wi-Fi," Apr. 12, 2016, Wikimedia Foundation, Inc.
"Ant-Sized loT Radio," Retrieved on Jul. 18, 2016.
Nick Pino, "Samsung's Latest OLED Can be a Mirror, a Window, or a TV," Jun. 11, 2015, Future US, Inc., San Francisco, California.
"Pneumatic Tube," Mar. 11, 2016, Wikimedia Foundation, Inc.
"New Virtual Tellers," Retrieved on Jun. 6, 2016, Frontier Bank.
Dario Borghino, "High-Tech Light Shutter Could Help Turn Your Windows into LCD Displays," May 1, 2015, Gizmag.
L. Zhao et al. "Novel Method for Fabricating Flexible Active Matrix Organic Light Emitting Diode (AMOLED) Displays," Sep. 21, 2011, Hewlett-Packard Development Company, L.P.
Amar Toor, "LG Unveils Flexible Plastic E-paper Display, Aims for European Launch Next Month," Mar. 29, 2012.
Martyn Williams, "Samsung, LG Show Flexible OLED, E-Paper Screens," Nov. 10, 2010.
"Electronic Paper," Jun. 10, 2016, Wikimedia Foundation, Inc.

(56) References Cited

OTHER PUBLICATIONS

"E Ink," Jun. 8, 2016, Wikimedia Foundation, Inc.
"Ink Technology: Electrophoretic Ink, Explained," Retrieved on Jun. 20, 2016, E Ink Holdings, Inc.
"Are Toeprints Unique, Like Fingerprints?" Retrieved on Jun. 23, 2016.
Sampath Srinivas, Dirk Balfanz, Eric Tiffany, Alexi Czeskis, "Univeral $2^{nd}$ Factor (U2F) Overview", May 14, 2016, FIDO Alliance.
"Sonavation Announces Fingerprint Imaging Through Smart Phone OLED Display," Feb. 22, 2016.
Dario Borghino, "Wearable Thermoelectric Generator Could Extend Your Smartwatch's Battery Life", Apr. 14, 2014, Gizmag.
"Inductive Charging", May 6, 2016, Wikimedia Foundation, Inc.
"Near Field Communication", Apr. 29, 2016, Wikimedia Foundation, Inc.
Sumi Das, "A Keyboard that Rises Up From Flat Touch Screens," Feb. 13, 2013.
Jessica Leber, "A Shape-Shifting Smartphone Touch Screen," Dec. 3, 2012.
Matthew Frankel, "Could This Be the Bank of the Future?" Nov. 9, 2014.
"Contactless Payment," Jul. 27, 2016, Wikimedia Foundation, Inc.
Zhiquin Chen, "Java Card Technology for Smart Cards: Architecture and Programmer's Guide," pp. 11-14, Copyright 2000, Sun Microsystems, Inc., Palo Alto, California.

\* cited by examiner

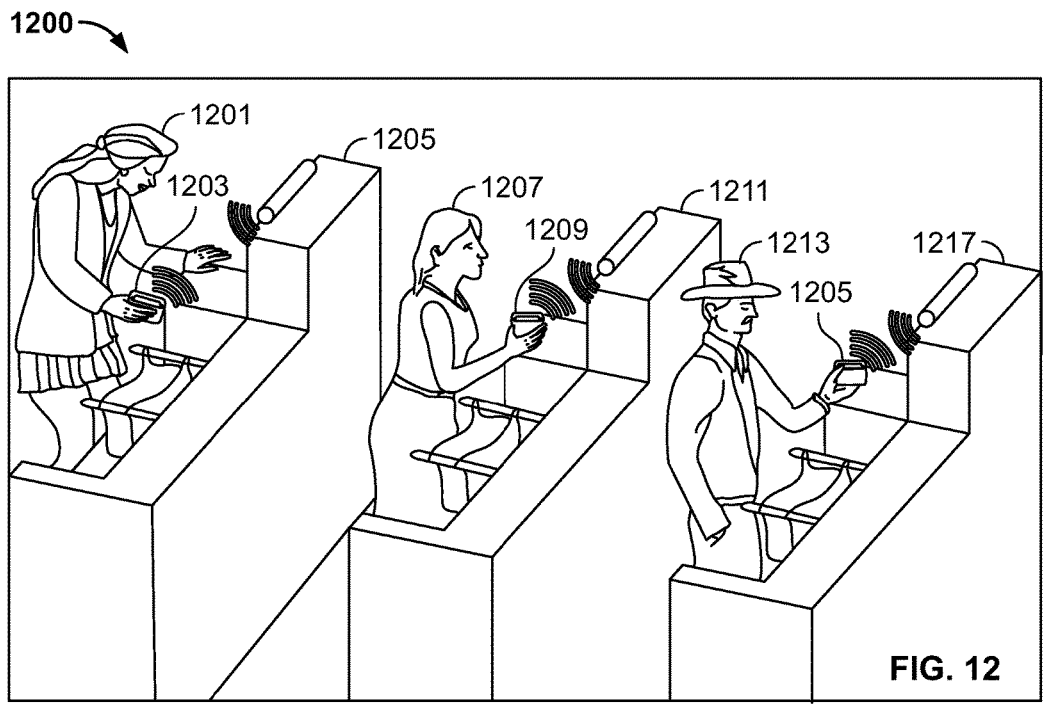
FIG. 12
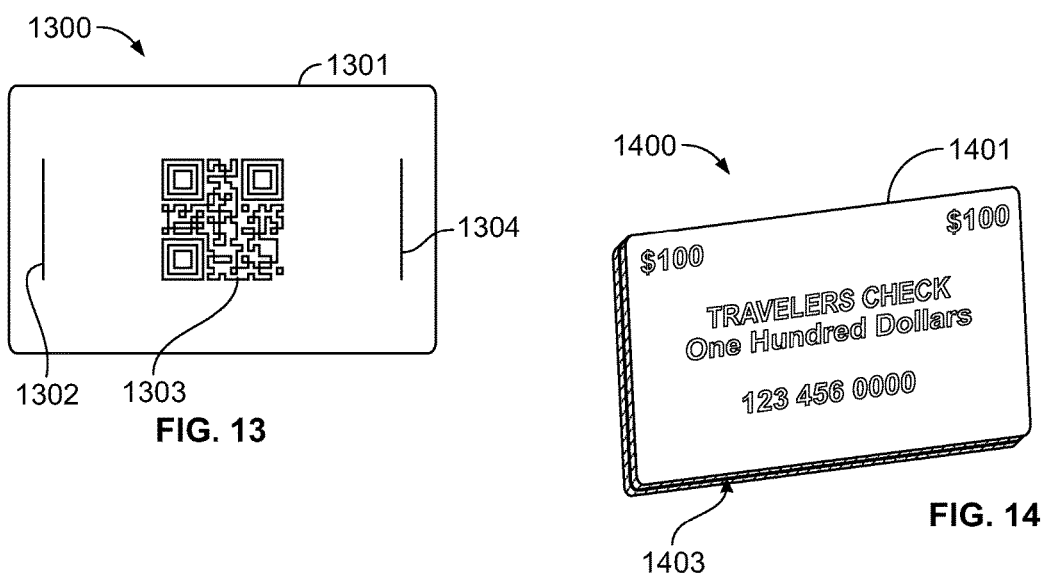
FIG. 13
FIG. 14

ORGANIC LIGHT EMITTING DIODE ("OLED") TRAVEL CARD

FIELD OF TECHNOLOGY

Aspects of the invention relate to components for constructing a purchasing instrument that includes enhanced electronic features.

BACKGROUND

A traveler anticipating a visit to a particular country may obtain a purchasing instrument, such as traveler's checks in a desired currency. Traveler's checks may insulate travelers from fluctuating foreign exchange rates. Like cash, traveler's checks may include static anti-counterfeiting properties. Such anti-counterfeiting properties may include special paper or embedded designs. However, such static anti-counterfeiting properties are at risk of being identified, copied and/or otherwise duplicated.

Traveler's checks are also typically limited to a currency and denomination printed on a face of the document. Accordingly, a traveler's spending is limited by the amount and currency on his or her traveler's checks.

A traveler may also utilize credit cards or other purchasing instruments in lieu of traveler's checks. However, use of such a purchasing instrument is also associated with risks.

Typically, sensitive data associated with a credit card, or other purchasing instrument, is printed on a face (front or back) of the card. The sensitive data may include a unique card number, a card holder's name, an expiration date of the credit card number, an amount, a currency, a card verification value ("CVV") or any other suitable sensitive data.

The sensitive data may be visible to an onlooker who may obtain a copy (e.g., by taking a picture) of the sensitive data. The copied sensitive data may be used to initiate fraudulent transactions.

Typically, credit cards also include sensitive data encoded on a magnetic stripe. The sensitive data encoded on the magnetic stripe is read when the card is "swiped" through a card reader. Thieves may utilize a skimming device to obtain a copy of the sensitive data encoded on the magnetic stripe. For example, a thief may utilize a skimming device placed on or in an automated teller machine ("ATM"). The skimmer may be placed over a card slot reader of the ATM and may read the magnetic stripe as the card is inserted into the slot.

A traveler may not notice that a skimmer has been placed on or in an ATM because the skimmer may not impede access to the ATM or card reader. Thus, the skimmer may obtain a copy of the sensitive data encoded on a credit card's magnetic stripe in a manner transparent to the traveler.

Technology is currently being developed that may reduce a risk of a thief obtaining a copy of sensitive credit card data. For example, some credit cards are now produced with "EMV" chips. EMV is a technology that derives its name from the companies (Europay, MasterCard, and Visa) that helped develop the technology. When the credit card and its associated EMV chip are inserted into a specialized card reader, the reader powers the EMV chip and the EMV chip generates a new authorization code each time the credit card is used. Thus, simply copying the sensitive data printed on the face of the credit card or encoded on the magnetic stripe may be insufficient to initiate a fraudulent transaction.

In addition to technology specifically developed to combat fraud, it would be desirable to leverage other technology to design a purchasing instrument that is more protective of sensitive data associated with the purchasing instrument.

However, the relevant form factor associated with purchasing instruments is limited. Purchasing instruments are typically 85.60 millimeters ("mm")×53.98 mm×0.8 mm. This limited form factor allows purchasing instruments to fit into a traveler's wallet or pocket. Yet, this form factor also presents design challenges. For example, one design challenge involves the difficulty of attempting to include electronic features within the limited form factor. For example, to maintain this limited form factor, a purchasing instrument cannot be constructed using a relatively large power supply.

Furthermore, travelers typically expect to be able to fold or bend purchasing instruments. For example, a traveler may expect to fold a traveler's check and store the check in a wallet or pocket.

In would be desirable to provide a purchasing instrument that more securely protect sensitive data.

In would be desirable to provide a purchasing instrument that incorporates electronic features that allow for efficient use and functionality of such purchasing instruments.

It would be desirable to provide a purchasing instrument that includes electronic features and allows travelers to fold or bend the purchasing instrument.

Accordingly, it would be desirable to provide systems and methods for an OLED-Based Travel Card.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 12 shows an illustrative scenario and apparatus in accordance with principles of the invention;

FIG. 13 shows illustrative apparatus in accordance with principles of the invention;

FIG. 14 shows illustrative apparatus in accordance with principles of the invention;

DETAILED DESCRIPTION

Figure 1A:
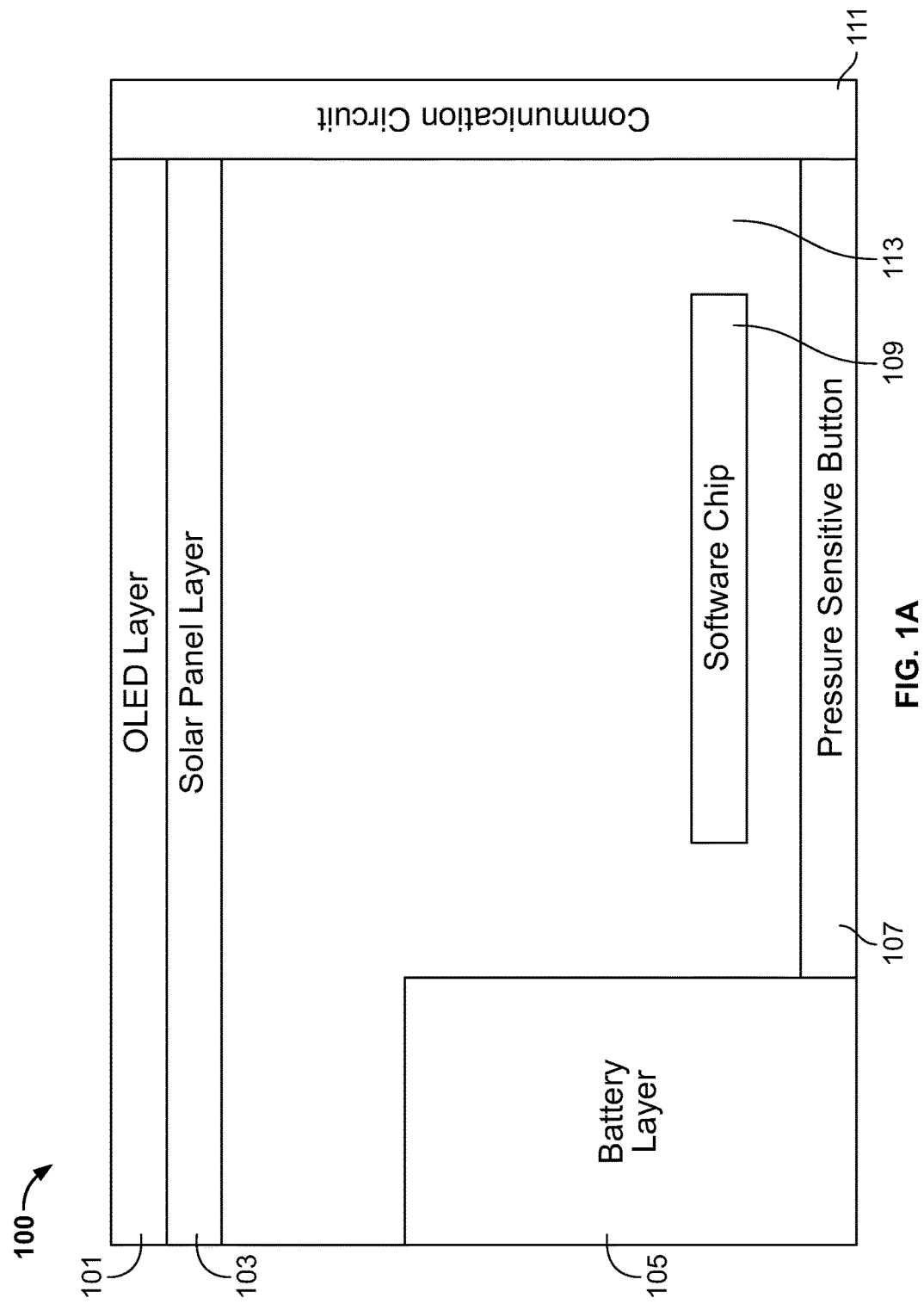
FIG. 1A shows illustrative apparatus in accordance with principles of the invention.

Aspects of the invention relate to a credit-card-size device (hereinafter, "smart card" or "smart check") that leverages organic light emitting diode ("OLED") technology to enhance security of sensitive data associated with a traveler's check or other purchasing instruments.

Aspects of the invention also relate to a smart card or smart check that leverages organic light emitting diode ("OLED") technology to enhance functionality and usability of a purchasing instrument.

OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

OLEDs may also be used to construct a display that is flexible. OLED displays may be folded, bent or rolled. An exemplary smart check as described herein may be passed through a check reader that typically bends a paper check when reading the check. The OLED display may be configured to present information on a face of the smart check such that the smart check presents information that is formatted and positioned on the face of the smart check as expected by check readers that typically read paper checks.

Furthermore, OLEDs may be used to construct a display that consumes less power compared to other display technologies. For example, in a Liquid Crystal Display (hereinafter, "LCD") power must be supplied to the entire backlight to illuminate just one pixel in the display. In contrast, an OLED display does not necessarily include a backlight. Furthermore, in an OLED display, preferably, only the illuminated pixel draws power.

Therefore, power efficiency of OLED technology presents a possibility for designing electronic purchasing instruments (hereinafter, "smart checks") that provide enhanced security and functionality.

As used herein, a smart check may function as any suitable purchasing instrument. Suitable purchasing instruments may include a credit card, check, traveler's checks, debit card and any suitable purchasing device. Suitable purchasing instruments may include purchasing instruments that conform to specifications published by the International Organization for Standardization. Illustrative specifications may include: ISO/IEC 7810, ISO/IEC 7811 and ISO/IEC 7816, which are hereby incorporated herein by reference in their respective entireties.

The smart check may not present any sensitive data printed or embossed on a face of the smart check. Rather, sensitive data may be electronically stored within the smart check. The sensitive data stored within the smart check may only be visible when presented on an OLED display of the smart check. The smart check may store sensitive data associated with two or more purchasing instruments. The smart check may be configured to periodically display sensitive data in response to pre-determined conditions.

Sensitive data stored on the smart check may be altered. For example, a traveler or smart check user (collectively, "user") may add sensitive data and thereby store a new purchasing instrument on the smart check. A representation of the new purchasing instruments or currency value stored within the smart check may be presented to a user using an OLED display.

As further example, sensitive data may include a currency value. The currency value may be dynamically altered based on a geographic location of the smart check or a change in foreign currency exchange rates. A value stored on the smart check may be increased or decreased based on a geographic location of the smart check. In a certain location, specific purchasing instruments stored on the smart check may be disabled.

In some embodiments, a currency value stored on the smart check may be associated with a default currency or a default country. A default currency/country may be specified by a user. For example, The default currency/country may be selected by the user at a time the value is stored on the smart check.

A default currency/country may be determined based a residence of a user. The default currency/country may be associated with any country or currency. For example, a default currency may include an electronic currency that is unaffiliated with a particular country.

The user may attempt to use the smart check in a country or as a currency that is different from the default currency/country. A currency and amount of the currency activated and/or presented on the smart check may be determined based on a currency exchange rate for converting the default currency value into any desired currency. For example, a default currency value may be automatically converted into a currency of a country where the smart check is being used. The smart check may identify a location or currency when inserted into a POS terminal and/or when communicating with a network access point.

The OLED display may be touch-sensitive. The user may select a purchasing instrument stored on the smart check by touching a displayed representation corresponding to a desired purchasing instrument. Some embodiments may include an OLED display on front and back faces of the smart check. Some embodiments may include an OLED display on a thickness of the smart check. The OLED display may enable video playback capability.

In response to a user selection, or in response to certain pre-determined conditions, sensitive data stored on the smart check may be deleted. For example, sensitive data may be deleted in response to expiration of a purchasing instrument. Sensitive data may be deleted in response to detecting a potential security breach. In some embodiments, sensitive data may be deleted when a smart check associated with a security breach is used at a merchant point-of-sale ("POS") terminal.

Waiting for the smart check to be used at the POS terminal may allow a potential fraud and thief to be identified at the POS terminal. For example, an authorized user of the smart check may report to an entity that issued the smart check that the smart check has been lost or stolen. In response the user's report, a fraud flag may be associated with sensitive data of the smart check. In some embodiments, when the smart check connects to a network, the fraud flag may be pushed to and stored on the smart check.

In some embodiments, when the smart check is reported as lost or stolen, a decoy set of sensitive data may be pushed to the smart check. The decoy set of sensitive data may include executable code that reports to a central location each time the decoy set of sensitive data is copied, stored or any other suitable operation performed on the decoy set of sensitive data. For example, the executable code may transmit a time/date stamp and location of when and where the decoy set of sensitive data was copied.

The sensitive data previously stored on smart card reported by the authorized user as lost or stolen may be deleted. In some embodiments, the fraud flag may indicate that security of sensitive data stored on the smart check has been compromised.

When a smart check reported as lost or stolen is used at a POS terminal, the associated fraud flag may trigger a fraud detection process. The fraud detection process may include instructing the POS terminal to capture a biometric feature or a picture of a potentially unauthorized individual who presented the flagged smart check at the POS terminal. The fraud detection process may include denying a transaction or purchase initiated at the POS terminal using the flagged smart check or any other suitable fraud prevention measure. Waiting until the flagged smart check is used at a POS terminal may increase a possibility of identifying who compromised the security of the sensitive data, where/how the compromise occurred and who has attempted to use the comprised sensitive data.

The smart check may include one or more biometric sensors. Illustrative biometric sensors may include a fingerprint scanner, camera, microphone or any other suitable sensor for capturing a biometric feature. To authenticate a release of sensitive data, a user may present a biometric feature to the biometric sensor for verification. The smart check may only authorize release of the sensitive data after verifying a submitted biometric feature.

The smart check may enable more secure financial transactions. For example, online banking transactions may be made more secure by requiring entry of a valid biometric feature, such as a fingerprint, prior to authorizing a transaction or accessing an online banking portal. Embodiments may utilize a camera to verify a biometric feature or identity of a user prior to authorizing a transaction.

The smart check may be powered by a battery. The battery may be recharged when the smart check is inserted into an ATM or other card reader. A smart check may store currency in way that is portable, transferrable and more tangible than virtual currency. The smart check may utilize an OLED display to present an image of a denomination and currency. The currency displayed may be determined based on a location of the smart check.

For example, a cruise may include multiple stops at a plurality of countries. Each country may be associated with a different currency. At each stop, a value stored on the smart check and currency associated with the stored value may be automatically updated and displayed.

A location of the smart check may be detected based on an access point used by the smart check to access a network. In some embodiments, the smart check may include a GPS chip for receiving and/or transmitting GPS signals. In some embodiments, the smart check may include cellular telecommunication capabilities. A location of the smart check may be determined using cellular triangulation techniques. In some embodiment, the cellular telecommunication capabilities may only be used to determine a location of the smart check.

In some embodiments, an ATM or POS terminal may include a card reader that detects light, color or a pattern presented on an OLED display. A presented pattern may include a quick response ("QR") code. In some embodiments, such light or color patterns may be used to present sensitive data to a card reader in a way that reduces a risk of exposure of the sensitive data.

Apparatus for a smart check are provided. The smart check may include an array of OLEDs. The OLEDs may form one or more pixels. The OLEDs may form a display of the smart check. The OLED display may be visible on a front face, back face and/or thickness of the smart check.

The OLED display may have a thickness that is not greater than 0.25 mm. The OLED display may cover some or all of a surface area. The surface area may include one or more of the faces or thickness of the smart check. For example, the surface area may be 85.60 mm×53.98 mm. The OLED display may cover 10%, 30%, 50%, 75%, 90%, 100% or any suitable percentage of the of the surface area.

The smart check may be any suitable size. For example, the smart check may not be greater than 86 mm×54 mm×0.8 mm. Dimensions of a smart check may be based on dimensions of a paper check. For example, in the United States, personal checks are typically 6 inches ("in.")×2¾ in. An exemplary smart check may be 6 in.×2¾ in.×0.8 mm.

Dimensions of a smart check may be based on dimensions of paper currency. For example, United States currency bills are typically 2.61 in.×6.14 in. An exemplary smart check may be 2.61 in.×6.14 in 6 in.×0.8 mm.

The OLED display may include a substrate layer that supports the array of OLEDs. The smart check may include a circuitry layer that controls illumination of one or more pixels formed by the array of OLEDs. The smart check may include a barrier layer that keeps contaminants out of the array of OLEDs. A total thickness of the substrate layer, the array of OLEDs, the circuitry layer and the barrier layer may not be greater than 0.5 mm.

The smart check may include a communication circuit. The communication circuit may be configured to implement protocols for wireless communication. For example, the communication circuit may provide Wi-Fi, near field communication ("NFC"), Bluetooth or any other suitable mode of wireless communication. Wi-Fi may include passive Wi-Fi with lower power consumption than typical Wi-Fi. The communication circuit may have a thickness that is not greater than 0.8 mm.

The smart check may include a processor circuit. The processor circuit may alternatively be referred to herein as a software chip. The processor circuit may have a thickness that is not greater than 0.25 mm. The processor circuit may include a processor for controlling overall operation of the smart check and its associated components. The smart check may include RAM, ROM, an input/output ("I/O") module and a non-transitory or non-volatile memory.

The I/O module may include a microphone, button and/or touch screen which may accept user provided input. The I/O module may include one or more of a speaker for providing audio output and a display for providing textual, audiovisual and/or graphical output. The display may include one or more OLEDs.

Software may be stored within the non-transitory memory and/or other storage media. The software may provide instructions to the processor for enabling the smart check to perform various functions. For example, the non-transitory memory may store software used by the smart check, such as an operating system, application programs, web browser and a database. Alternatively, some or all of computer executable instructions of the smart check may be embodied in hardware or firmware components of the smart check.

Application programs, which may be used by the smart check, may include computer executable instructions for invoking user functionality related to communication, such as email, short message service ("SMS"), and voice input and speech recognition applications. Application programs may utilize one or more algorithms that securely store currency, encrypt currency, process received executable instructions, perform power management routines or other suitable tasks.

The smart check may include a pressure sensitive button. The pressure sensitive button may have a thickness that is not greater than 0.8 mm. The pressure sensitive button may be actuated by a user to activate the smart check. For example, actuating the pressure sensitive button may activate the processor or communication circuits.

In some embodiments, the smart check may be activated in response to receiving high frequency wireless signals. The high frequency signals may provide power to one or more components of the smart check. In response to receiving the power, the processor circuit may be activated and begin to draw power from a battery on the smart check.

The smart check may operate in a networked environment. The smart check may support establishing network connections to one or more remote computers. Such remote computers may be nodes on a network. The nodes may be personal computers or servers that include many or all of the elements described above relative to the smart check. The network connections may include a local area network ("LAN") and a wide area network ("WAN"), and may also include other networks. When used in a LAN networking environment, the smart check may be connected to the LAN through a network interface or adapter. The communication circuit may include the network interface or adapter.

When used in a WAN networking environment, the smart check may include a modem or other means for establishing communications over a WAN, such as the Internet. The communication circuit may include the modem.

It will be appreciated that the network connections shown are illustrative and other means of establishing a communications link between devices may be used. The existence of any of various well-known protocols such as TCP/IP, Ethernet, FTP, HTTP and the like is presumed, and the smart check can be operated in a client-server configuration to permit a user to retrieve web pages from a web-based server. Web browsers can be used to display and manipulate data on web pages.

The smart check and network nodes may include various other components, such as a battery, a speaker, and antennas (not shown). For example, network nodes may be portable devices such as a laptop, a tablet, a smartphone or any other suitable device for receiving, storing, transmitting and/or displaying relevant information.

The smart check may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The smart check may utilize computer-executable instructions, such as program modules, being executed by a computer. Generally, program modules include routines, programs, objects, components, data structures, etc. that perform particular tasks or implement particular abstract data types. The smart check may be operational with distributed computing environments where tasks are performed by remote processing devices that are linked through a communications network. In a distributed computing environment, program modules may be located in both local and remote computer storage media including memory storage devices.

The smart check may include one or more batteries. The battery may be flexible. The battery may be a power source for electronic components of the smart check. For example, the battery may supply power to the OLED display, the communication circuit and the processor circuit. The battery may have a thickness that is not greater than 0.5 mm.

The smart check's power source may include high frequency signals received from a node on a wireless network. The smart check's power source may include a battery. The smart check may be configured to utilize received high frequency signals to recharge the battery or provide power to other components of the smart check.

The smart check may include a contact. The smart check may include a plurality of contacts. A contact may be accessible on any suitable face of the smart check. For example, the contact may be accessible on a second face of the smart check opposite the OLED display. The contact may be accessible on a thickness of the smart check opposite the OLED display. The contact may transfer electrical charge to the rechargeable battery when the smart check is inserted into a card reader.

A contact may be constructed using any suitable material that conducts or transfers electricity.

The non-transitory memory may store a value. The value may represent an amount of money stored on the smart check. The value may be encrypted. The value may be associated with a first currency.

In operation, when the smart check is inserted into the card reader and electrical charge is transferred from the card reader to the rechargeable battery via the contact, the smart check may also receive, via the contact, a location associated with the card reader. The smart check may also receive, via the contact, second currency information. The location and second currency information may be stored in the non-transitory memory.

When the processor circuit accesses the encrypted value the processor circuit may convert the value into a second currency. The processor circuit may further instruct the OLED display to present the location and the second currency on a face of the smart check.

In some embodiments, in operation, the processor circuit may instruct the communication circuit to scan for a wireless network. In response to detecting a wireless network, the communication circuit may connect the smart check to a node on the wireless network. The communication circuit may obtain location information associated with the node.

After obtaining the location information, when the processor circuit accesses the encrypted value, the processor circuit may convert the encrypted value into a third currency associated with the location received from the node. The smart check may obtain one or more exchange rates via the network node. The processor circuit may convert the value into the third currency based on the exchange rate obtained from the node. The OLED display may be configured to present the third currency on the face of the smart check.

When the processor circuit detects that electrical charge is being transferred via the contact, the processor circuit may power-off the communication circuit.

In some embodiments, the communication circuit may have variable transmitting and receiving ranges. For example, the communication circuit may utilize an NFC protocol to communicate with the network node. Illustrative protocols for NFC are provided by the NFC Forum at www.nfc-forum.org.

The smart check may be configured to communicate using a typical Wi-Fi range such as 150-300 ft. when searching for available wireless network. The communication circuit may communicate over a typical NFC range (~2 in.) when transmitting or receiving sensitive data. The smart check may be configured to dynamically limit or expand transmitting and receiving ranges.

The smart check's power source may include high frequency signals. The smart check may be configured to utilize high frequency signals to receive information from a network node and to power other components of the smart check (e.g., recharge the battery or power processor circuit).

High frequency signals may be signals that have a transmission range that is less than 50 centimeters ("cm"). The communication circuit may be configured to receive and transmit signals within a range that is less than 50 cm.

A network node may include a POS terminal. A POS terminal may include a network node. A user may utilize the smart check to transmit sensitive data to the POS terminal and pay for a purchase. The smart check may be configured to pay for the purchase using a currency associated with a location of the POS terminal. Via the OLED display, the user may be informed of a change in currency and a cost of the purchase in the currency used.

Apparatus for a smart check are provided. The smart check may include an array of OLEDs. The OLEDs may form one or more pixels of a face of the smart check. The OLEDs may form a display of the smart check. The OLED display may have a thickness that is not greater than 0.25 mm. The OLED display may have a surface area that is at least 90% of 85.60 mm×53.98 mm.

The smart check may include a battery. The battery may be flexible. The battery may be rechargeable. The smart check may include an inductive charging coil. The inductive charging coil may be embedded in the smart check. The inductive charging coil may be included in the communication circuit. The inductive charging coil may be a first inductive charging coil. The first inductive charging coil may be configured transfer electrical charge to the battery when the smart check is within a pre-determined range of a second inductive charging coil. The second inductive charging coil may be associated with a network node.

The first inductive charging coil may be configured to receive wireless communication signals transmitted by the second inductive charging coil. The wireless communication signals may conform to a protocol for implementing NFC. The wireless communication signals may conform to a protocol for implementing Wi-Fi communication.

Electrical charge transferred via the inductive coils may recharge the battery and power other components of the smart check. When the first inductive charging coil is within a pre-determined range of the second inductive charging coil, location information associated with the second inductive coil may be transferred to the smart check. The location information may be stored in non-transitory memory. The predetermined range may be not greater than 50 cm.

The OLED display may be configured to present a currency associated with the location information received by the first inductive charging coil via communication with the second inductive charging coil.

The processor circuit may be configured to generate a quick response ("QR") code. The QR code may be generated based on a result of one or more instructions received from the second inductive charging coil and processed by the processor circuit. The processor circuit may configure the OLED display to present the QR code for a pre-determined time period.

For example, the QR code may include sensitive data for transmission to a network node (e.g., a POS terminal). Formulating sensitive data as a QR code may obscure the sensitive data from being observed by an onlooker. In some embodiments, the QR code may include a transaction history or other meta-data associated with use of the smart check. The QR code may include a link to such information. A user may scan the QR code to access the meta-data and/or conduct further analysis of the meta-data. The QR code may allow the user to access the meta-data without using processing or battery power of the smart check.

The processor circuit may be configured to detect when the first inductive charging coil is being powered by the battery and not by signals received from the second inductive charging coil. In such scenarios, the processor circuit may instruct the communication circuit to scan for a wireless network and connect to a node on the wireless network. The processor circuit may obtain location information associated with the network node. The OLED display may present a currency associated with the location of the network node. A network node may include a mobile device.

When the first inductive charging coil is connected to a network node, the processor circuit may instruct the OLED display to present identification of the wireless network on a pre-determined surface area of the OLED display.

Apparatus for a smart check is provided. In operation, a communication circuit of the smart check may be configured to receive a communication signal that provides power to the smart check. In response to the receiving power via the communication circuit, a processor circuit may instruct the communication circuit to scan for a wired or wireless network and connect to a node on a detected network.

The smart check may transmit an encrypted authentication key. The authentication key may be stored in non-transitory memory. The authentication key may be transmitted to the network node. The encrypted authentication key may authenticate the smart check to the network node. Once the smart check has been authenticated, the network node may allow the smart check access to sensitive data stored on other nodes or networks accessible via the network node.

After successful authentication, the smart check may obtain location information associated with the network node. In response to receiving the location information, the processor circuit may instruct the OLED display to present a value stored on the smart check in a currency associated with the location information.

When the smart check is in communication with a network node, the processor circuit may instruct the OLED display to mirror information displayed on the network node. For example, the network node may be a POS terminal. Typically, the POS terminal may include its own display for presenting purchase information. The POS terminal may push such purchasing information to the smart check via the network. The smart check may present the received information using the OLED display.

The OLED display may be touch-sensitive. The user may select one or more options presented on the OLED display by touching a presented option.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative side view of smart check 100. Smart check 100 includes OLED layer 101. OLED layer 101 may form a rollable, thin OLED display with relatively lower power consumption than other display technology.

Smart check 100 may include a touch sensor (not shown). The touch sensor may be not greater than 0.001 mm thick. In some embodiments, the touch sensor may be embedded within OLED layer 101. Integrating the touch sensor into the OLED layer 101 may reduce reflectivity due to any space between the touch sensor and OLED layer 101. Reducing reflectivity may increase visibility of information presented using OLED layer 101.

Using OLED layer 101 to display information may have several technical advantages. OLED displays may provide lower power consumption, wider viewing angles, better colors, higher contrast, operate in a wider temperature ranges and enable faster refresh rates than other display technology. In some embodiments, OLED displays may be fabricated directly on control circuitry. OLED displays may only include trace amounts of heavy metals. Thus, when disposed of, OLED display may be less harmful to the environment than other display technology.

Smart check 100 includes solar panel layer 103. OLED displays may be transparent when not illuminated. Thus when OLED layer 101 is not illuminated, OLED layer 101 may be transparent. Sunlight may pass through OLED layer 101 and reach solar panel layer 103. Solar panel layer 103 may convert solar energy into electricity that powers one or more components of smart check 100. Solar panel layer 103 may be thin enough to be flexible.

Smart check 100 includes battery 105. Battery 105 may be rechargeable. Battery 105 may be flexible. Battery 105 may be recharged by power generated by solar panel layer 103. Battery 105 may be rechargeable from a power source external to smart check 100.

Smart check 100 includes software chip 109. Software chip 109 may control overall operation of smart check 100 and its associated components. Software chip 109 may include the processor circuit. Software chip 109 may include a non-transitory memory. Smart check 100 may include non-transitory memory locations (not shown) within thickness 113. Software chip 109 may access such memory locations. The non-transitory memory locations may store instructions, that when executed by software chip 109, cause smart check 100 to perform various functions.

For example, memory locations may store software used by smart check 100, such as an operating system, application programs and an associated database.

Smart check 100 includes communication chip 111. Communication chip 111 may be a communication circuit. Communication chip 111 may provide smart check 100 with wireless communication functionality. Communication chip 111 may enable smart check 100 to communicate using a variety of communication protocols including, Wi-Fi, Bluetooth, Ethernet, NFC and cellular telecommunications.

Smart check 100 also includes pressure sensitive button 107. Pressure sensitive button 107 may be mechanically actuated. Actuation of pressure sensitive button 107 may provide an electronic signal to software chip 109 or any other component of smart check 100.

For example, mechanical actuation of pressure sensitive button 107 may power-on and/or power-off software chip 109. Mechanical actuation of pressure sensitive button 107 may inform software chip 109 of a user's selection of choices displayed using OLED layer 101.

FIG. 1 shows illustrative components 101-113 of smart check 100 in an arrangement within a thickness of smart check 100. The arrangement shown in FIG. 1 is illustrative. Smart check 100 may include additional components not shown in FIG. 1, such as a biometric sensor. One or more of components 101-113, and any additional components, may be arranged within smart check 100 in any suitable fashion. For example, pressure sensitive button may be located in space 113. OLED layer 101 and/or solar panel layer 103 may flex or bend to allow a user to mechanically actuate pressure sensitive button 107.

Some embodiments may not include all of components 101-113. For example, a smart check may not include solar panel layer 103 or pressure sensitive button 107.

Figure 1B:
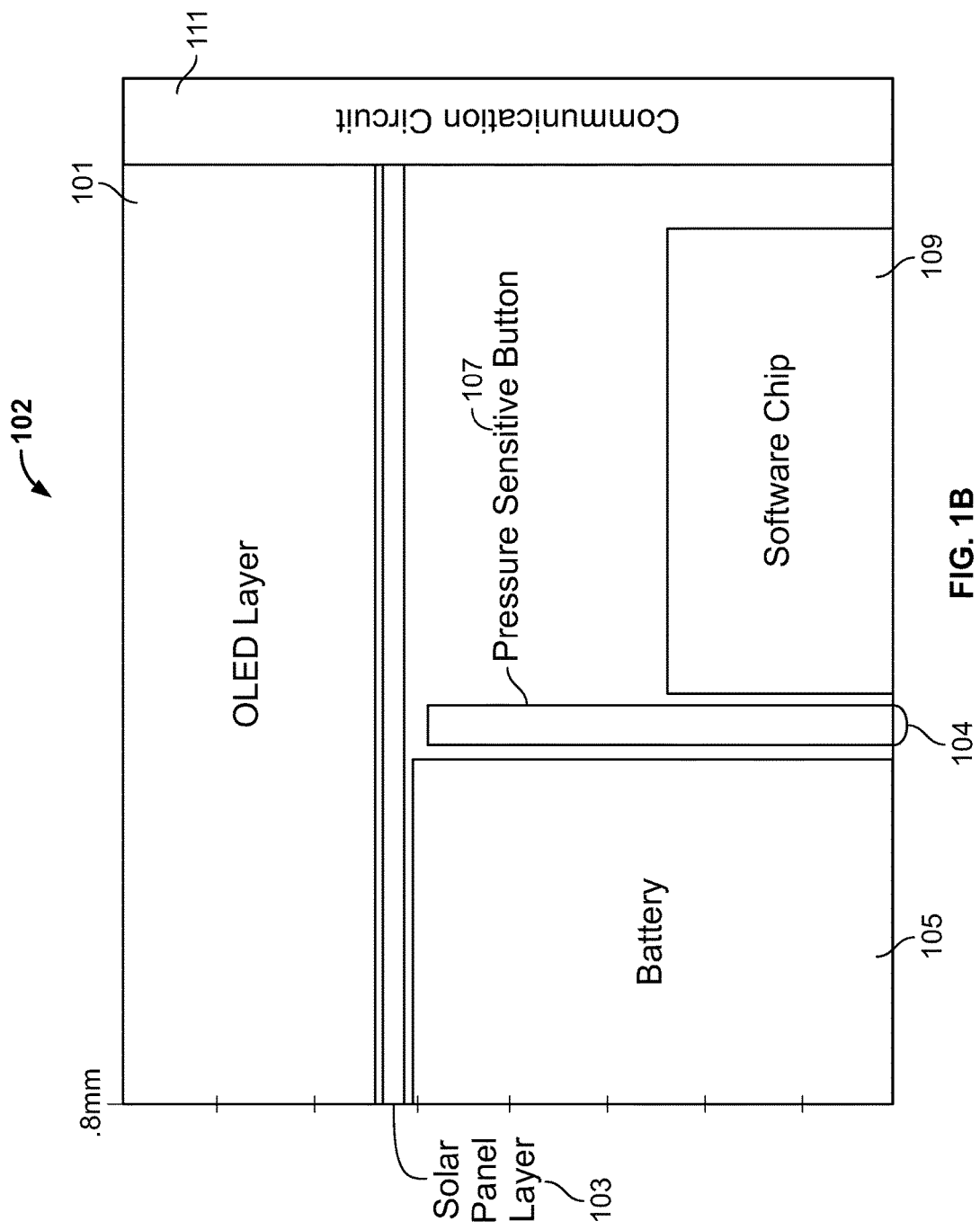
FIG. 1B shows illustrative apparatus in accordance with principles of the invention.

FIG. 1B shows illustrative view 102 of a smart check having a thickness of 0.8 mm. View 102 shows illustrative thicknesses of components 101-111. View 102 shows that in some embodiments, pressure sensitive button 107 may include a portion 104 that protrudes from a surface of a smart check. In some embodiments, pressure sensitive button 107 may include a portion 104 that dips below a surface of the smart check.

Figure 2:
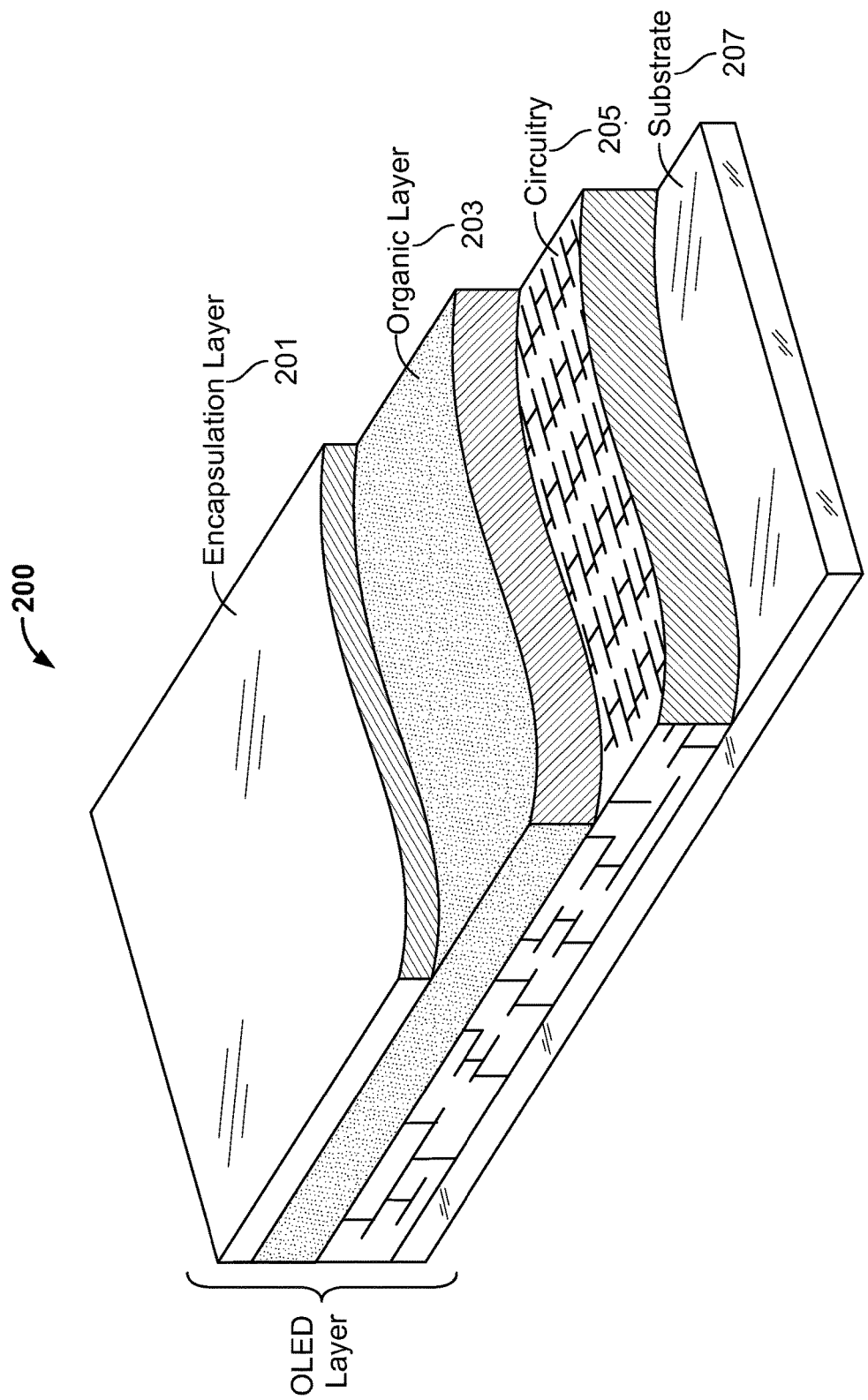
FIG. 2 shows illustrative apparatus in accordance with principles of the invention.

FIG. 2 shows structures 200 of an illustrative OLED layer, such as OLED layer 101 (shown in FIG. 1). Structures 200 include four layers: encapsulation layer 201, organic layer 203, circuitry layer 205 and substrate layer 207.

Encapsulation layer 201 protects the OLED layer from exposure to oxygen, water and other contaminants. Preferably, encapsulation layer 201 is flexible and transparent. Glass is an exemplary material that may be used to construct encapsulation layer 201. When glass is used to construct encapsulation layer 201, the glass may be very thin and flexible. For example, the glass may be between 50 micrometers ("μm") and 100 μm thick.

In some embodiments, encapsulation layer 201 may be constructed using thin-film encapsulation techniques such as Atomic Layer Deposition ("ALD"). ALD is a process that utilizes chemicals that, when deposited on a material, react to create a solid, thin film.

Structures 200 include organic layer 203.

Organic layer 203 typically includes an emissive solid-state semiconductor. Organic layer 203 may be constructed from a thin film of organic (carbon-based) material. For example, organic layer 203 may include one or more OLEDs. When electricity is applied to an OLED within organic layer 203, electrons flow through organic layer 203 and release photons, thereby emitting light. Different types of emissive materials may be used. Each type of material may be associated with a different color light. An intensity of light emitted by organic layer 203 may be controlled by the amount of electricity flowing through organic layer 203.

Organic layer 203 may be doped with "host" materials. Host material may affect a property, such as power efficiency, of organic layer 203. For example, organic layer 203 may be doped with materials that improve its operation and/or achieve a desired color.

Organic layer 203 may include two or more sub-layers (not shown). For example, organic layer 203 may include 5, 10 or 15 sublayers. Illustrative sub-layers may include: (1) an electron transport layer, (2) a blocking layer, (3) an emissive layer, (4) a hole transport layer and (5) an injection layer.

For example, an emissive layer may be placed between a cathode and an anode. When electricity is applied, electrons flow from the cathode to the anode. OLED displays may be driven by electrical current or voltage. In a preferred embodiment, the OLED display is driven by current. The cathode inserts electrons into the emissive layer, and the anode removes the electrons. Electron "flow" through the emissive layer releases photons, generating light. The color of the generated light may be changed by including different types of materials within the emissive layer.

A direction of light emitted by organic layer 203 may be controlled by a degree of transparency of the anode and/or cathode. In some embodiments, a cathode may be reflective. Such a cathode may preferably be constructing using an aluminum based-compound or lithium fluoride. An anode may be transparent. A transparent anode may preferably be constructed using indium tin oxide. In such embodiments, when current flows between the cathode and anode, light is emitted through circuitry layer 205 and substrate layer 207. Circuitry layer 205 and substrate layer 207 may be transparent. Such embodiments may be referred to as "bottom-emitting OLEDs."

In some embodiments, the cathode may be transparent. Such a cathode may preferably be constructed using indium tin oxide. The anode may be reflective. The reflective anode may direct light toward the transparent cathode. Such embodiments may be referred to as "top-emitting OLEDs." Typically, top-emitting designs are more efficient and are used to construct higher resolution OLED displays.

Additionally, top-emitting designs may allow organic layer 203 to be formed on a non-transparent substrate. Small- and medium-sized OLED displays (e.g., 1-7 inches) are typically constructed using top-emitting techniques.

Organic layer 203 may include one or more pixels. Different architectures are available for forming pixels using OLEDs. One exemplary architecture includes positioning different color (e.g., red, green and blue) OLEDs adjacent to each other. Another exemplary architecture includes stacking different color OLEDs on top of each other. OLEDs may be stacked because materials used to construct organic layer 203 may be transparent. A stacked design may provide a smaller pixel size and higher resolution.

Structures 200 include circuitry layer 205. Circuitry layer 205 includes electronics that drive one or more pixels formed within organic layer 203. Preferably, amorphous silicon ("a-Si") and low temperature polysilicon ("LTPS") may be used to construct circuitry layer 205. In some embodiments, circuitry layer 205 may be transparent.

Substrate layer 207 supports circuitry layer 205, organic layer 203 and encapsulation layer 201. Substrate layer 201 may be constructed using various materials. For example, substrate layer 207 may be constructed using glass, plastic or metal materials. In some embodiments, such as in bottom-emitting OLEDs, substrate layer 207 may function as encapsulation layer 201.

Figure 3:
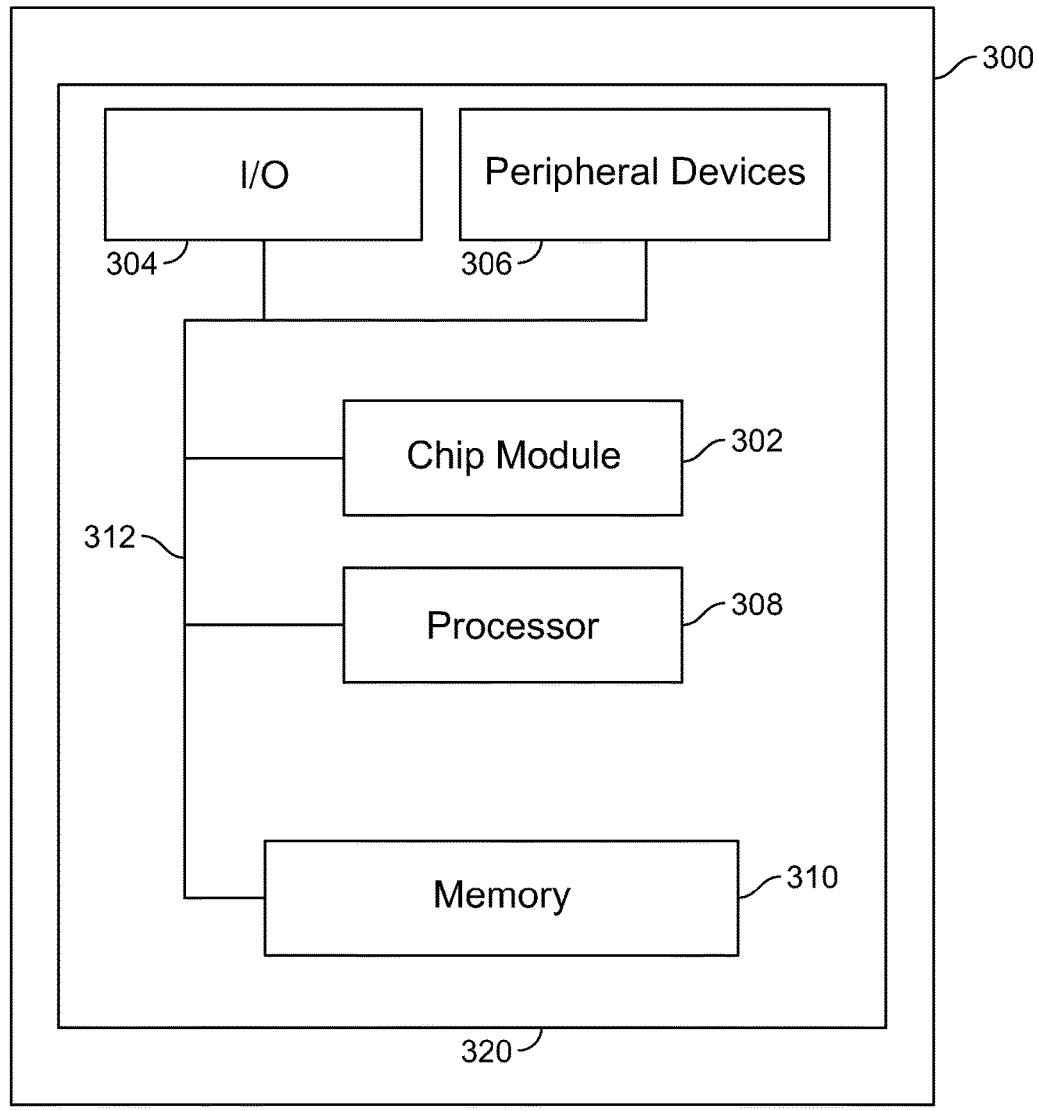
FIG. 3 shows illustrative apparatus in accordance with principles of the invention.

FIG. 3 shows illustrative software chip 300. Software chip 300 may include chip module 302, which may include one or more integrated circuits, and which may include logic configured to perform any suitable logical operation.

Software chip 300 may include one or more of the following components: I/O circuitry 304, which may include a transmitter device and a receiver device and may interface with fiber optic cable, coaxial cable, telephone lines, wireless devices, PHY layer hardware, a keypad/display control device or any other suitable encoded media or devices; peripheral devices 306, which may include counter timers, real-time timers, power-on reset generators or any other suitable peripheral devices; logical processing device 308, which may compute data structural information, structural parameters of the data, quantify indices; and machine-readable memory 310.

Machine-readable memory 310 may be configured to store, in machine-readable data structures: sensitive data, value, currency, currency exchange rates, location information, transaction histories, electronic signatures of biometric features or any other suitable information or data structures.

Components 302, 304, 306, 308 and 310 may be coupled together by a system bus or other interconnections 312 and may be present on one or more circuit boards such as circuit board 320. In some embodiments, the components may be integrated into a single chip. The chip may be silicon-based.

FIGS. 4-9 show illustrative layers that may be present within an illustrative smart check.

Figure 4:
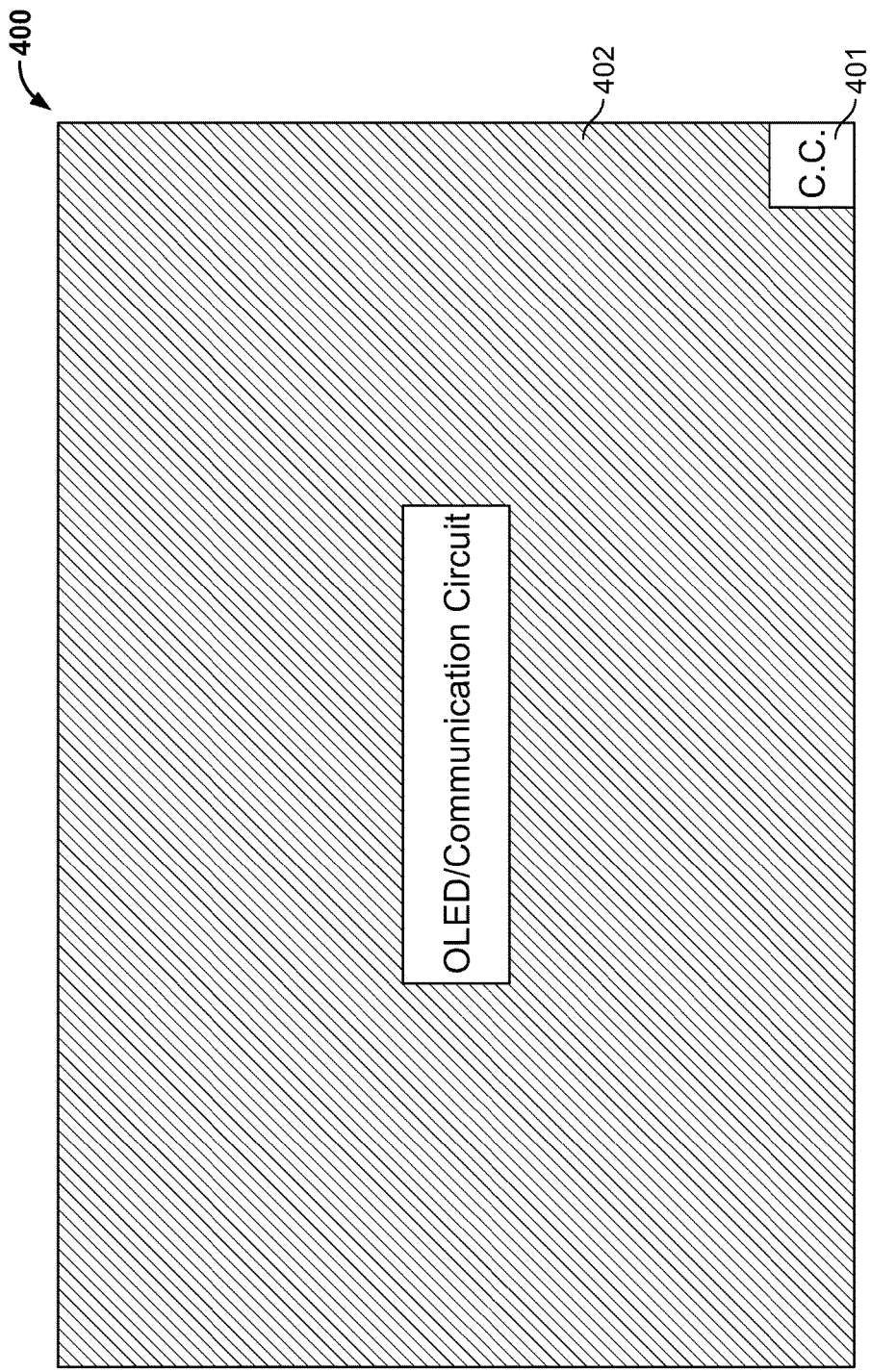
FIG. 4 shows illustrative apparatus in accordance with principles of the invention.

FIG. 4 shows illustrative layer 402. Layer 402 includes OLED layer (such as OLED layer 200, shown in FIG. 2). FIG. 4 also shows that, in some embodiments, communication circuit 401 may penetrate layer 402.

Figure 5:
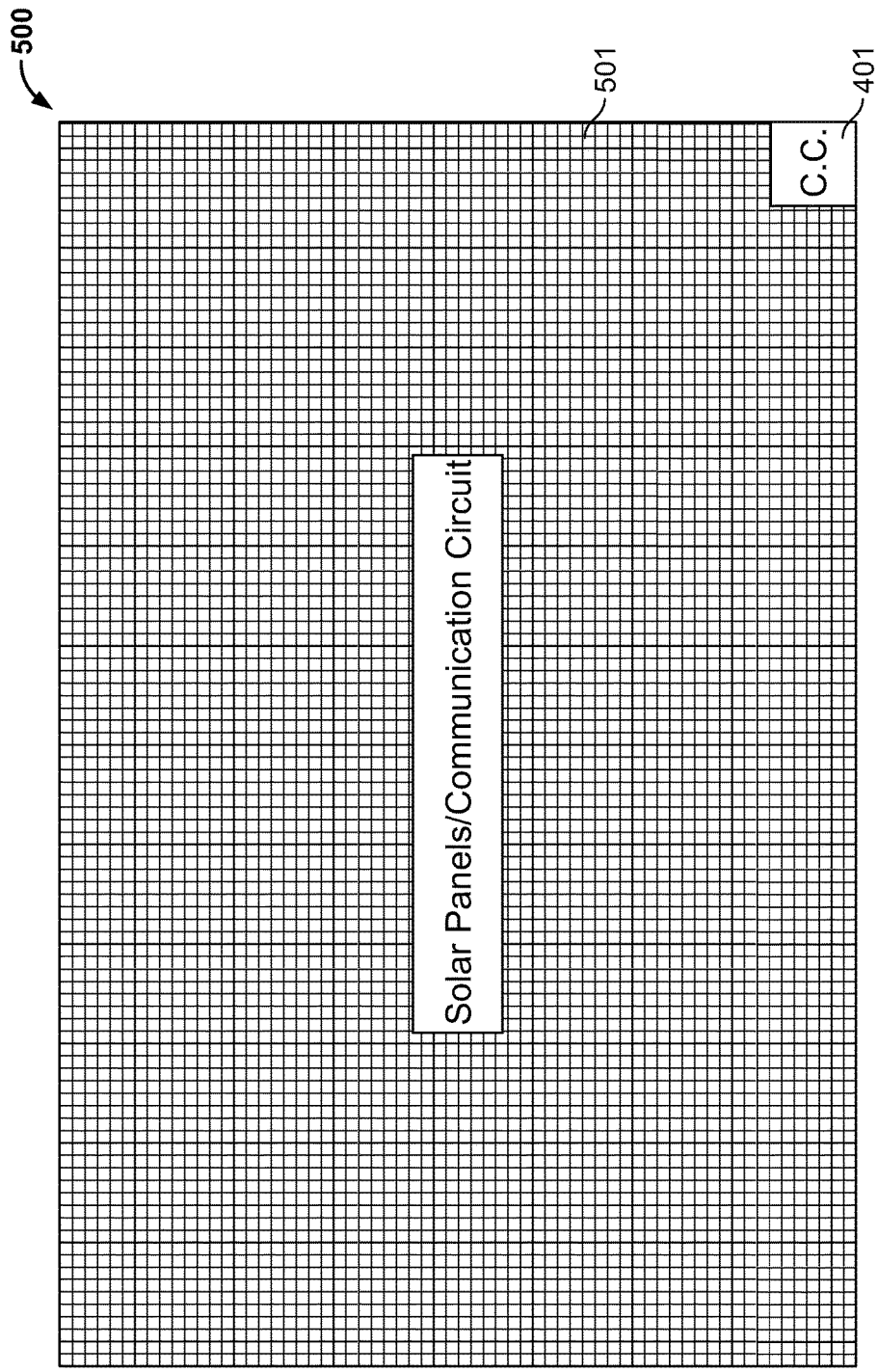
FIG. 5 shows illustrative apparatus in accordance with principles of the invention.

FIG. 5 shows illustrative layer 500. Layer 500 includes solar panels 501 that may be used to power various components of a smart check (e.g., circuitry layer 205, shown in FIG. 2). FIG. 5 also shows that, in some embodiments, communication circuit 401 may penetrate layer 500.

Figure 6:
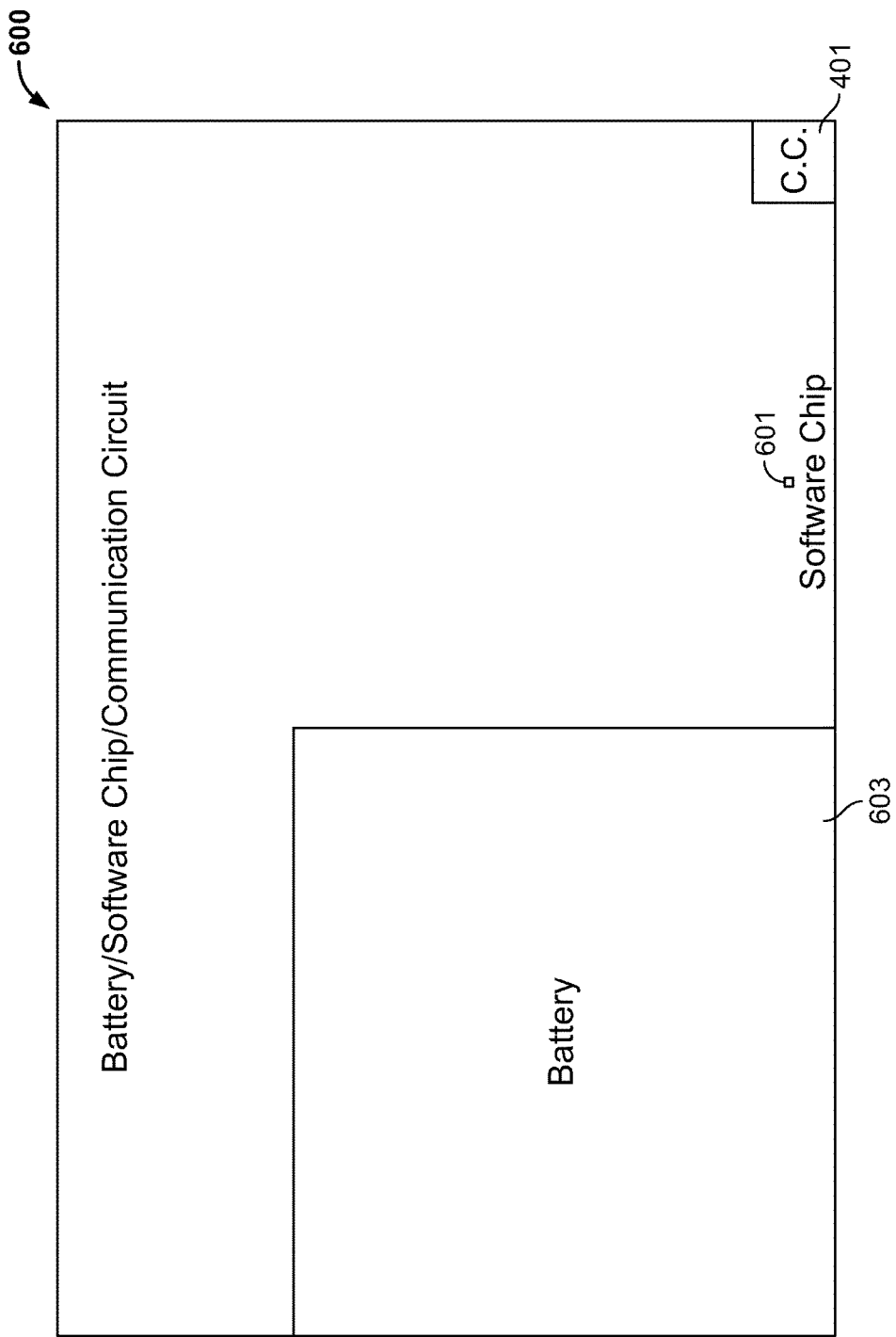
FIG. 6 shows illustrative apparatus in accordance with principles of the invention.

FIG. 6 shows illustrative layer 600. Layer 600 includes software chip 601. Software chip 601 may include one or more features of software chip 109 (shown in FIG. 1). Layer 600 includes battery 603. Battery 603 may include one or more features of battery layer 105 (shown in FIG. 1). FIG. 6 shows that, in some embodiments, communication circuit 401 may penetrate layer 600.

Figure 7:
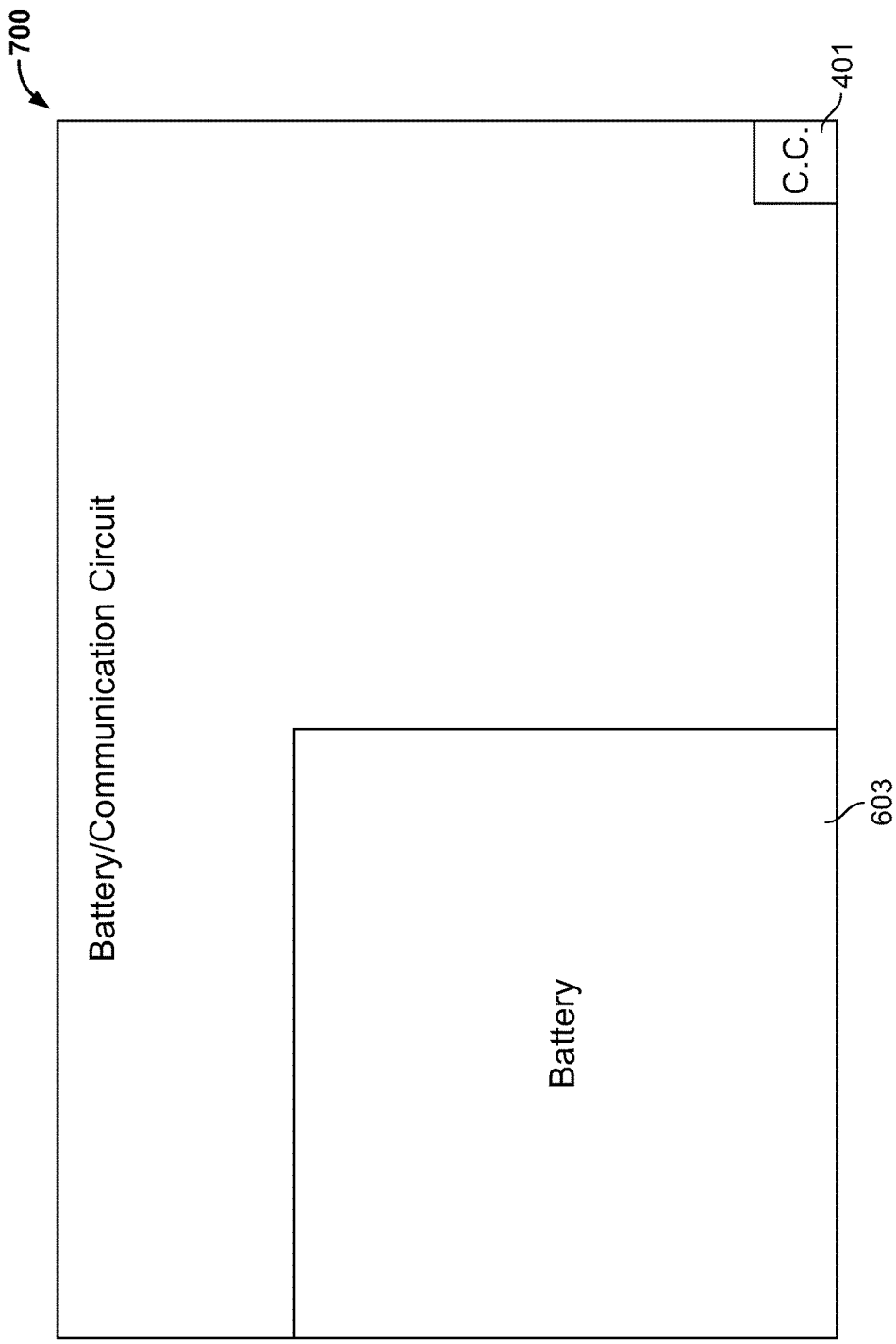
FIG. 7 shows illustrative apparatus in accordance with principles of the invention.

FIG. 7 shows illustrative layer 700. FIG. 7 shows that, in some embodiments, battery 603 may penetrate layer 700. FIG. 7 shows that, in some embodiments, communication circuit 401 may penetrate layer 700.

Figure 8:
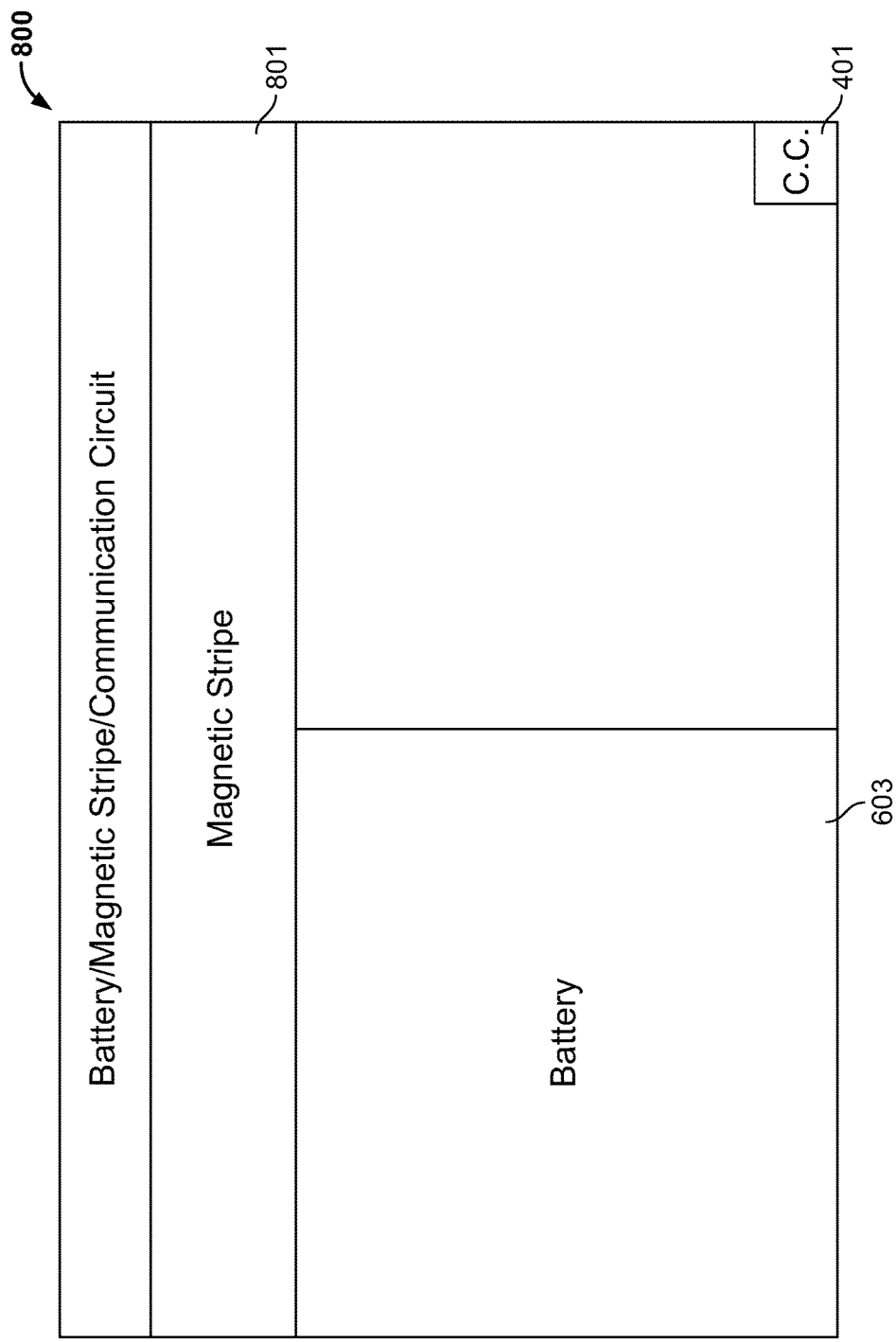
FIG. 8 shows illustrative apparatus in accordance with principles of the invention.

FIG. 8 shows illustrative layer 800. FIG. 8 shows that, in some embodiments, battery 603 may penetrate layer 800. FIG. 8 shows that, in some embodiments, communication circuit 401 may penetrate layer 800.

FIG. 8 shows that layer 800 may include magnetic stripe 801. Magnetic stripe 801 may include magnetically encoded information. Magnetic stripe 801 may provide backwards compatibility for smart checks described herein.

Figure 9:
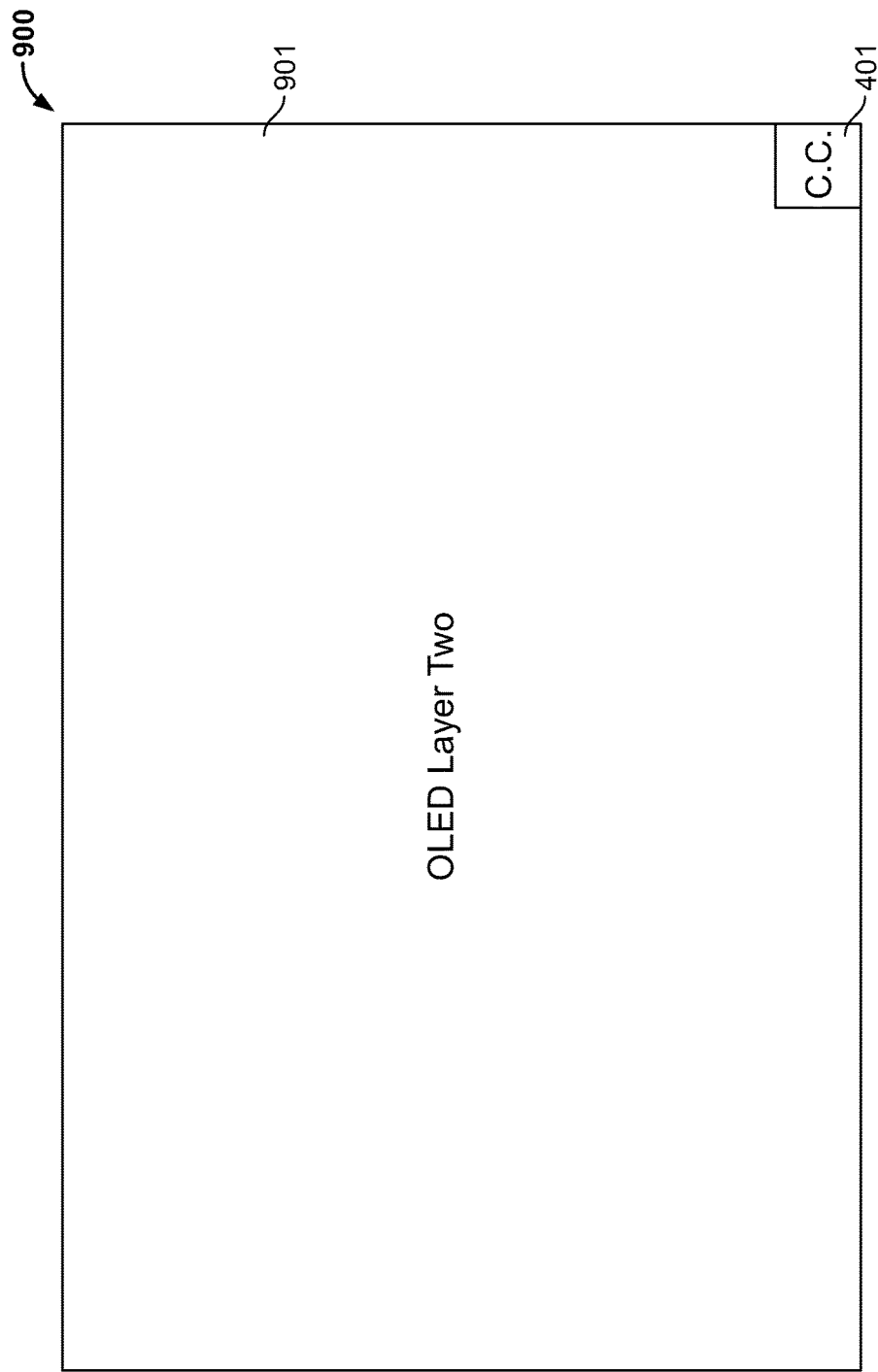
FIG. 9 shows illustrative apparatus in accordance with principles of the invention.

FIG. 9 shows illustrative layer 900. Layer 900 includes a second OLED layer 901. Second OLED layer 901 may include one or more features of OLED layer 200 (shown in FIG. 2). Second OLED layer 901 may allow front and back faces of a smart check to include an OLED display. FIG. 9 also shows that communication circuit 401 may penetrate layer 900.

Figure 10:
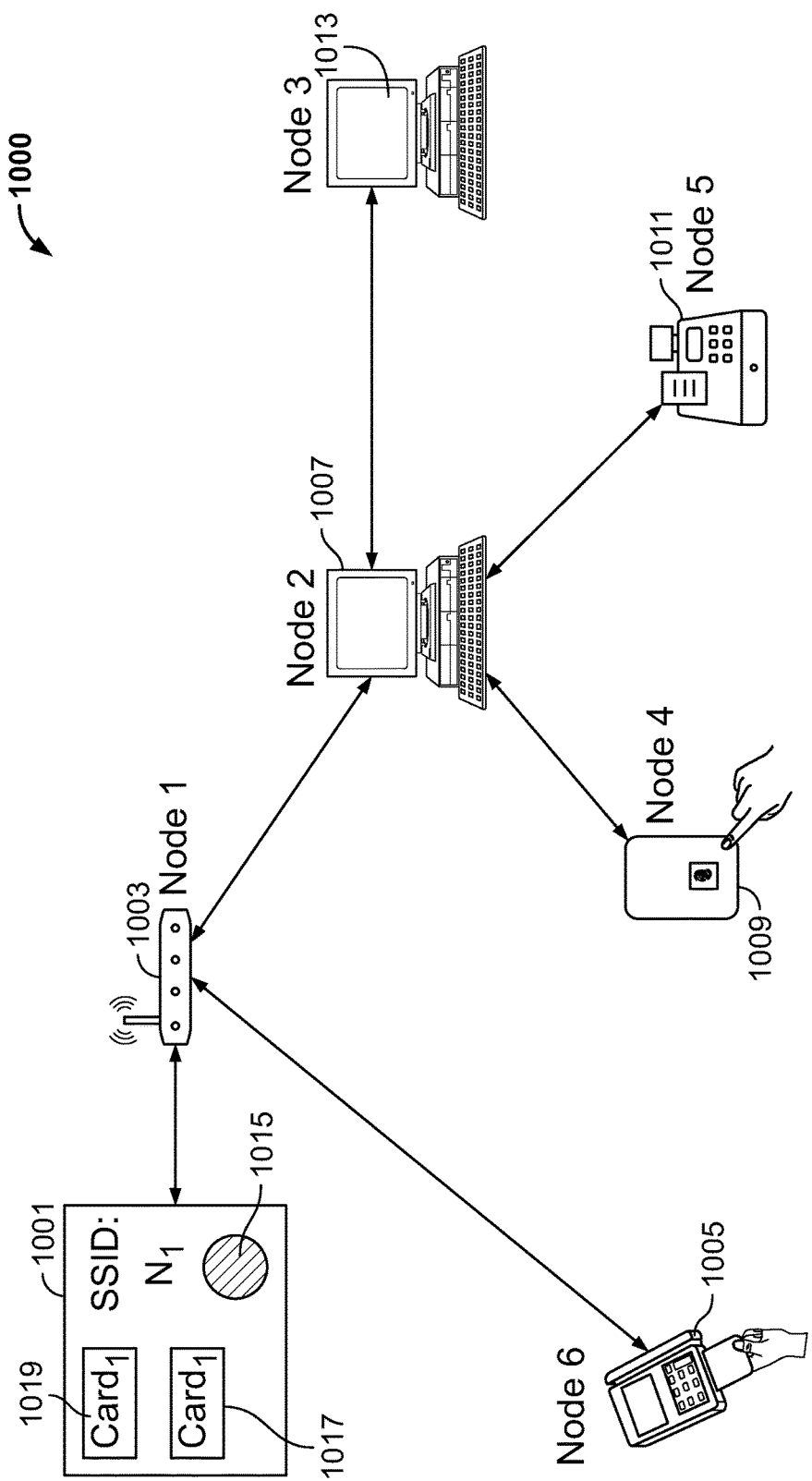
FIG. 10 shows illustrative apparatus in accordance with principles of the invention.

FIG. 10 shows illustrative network architecture 1000. Network architecture 1000 shows illustrative network nodes that may be accessed by smart check 1001. For example, smart check 1001 may access the network via access point 1003. The network may be a wireless network. The network may be a wired network. The network may include a combination of wired and wireless nodes. The network may include two or more networks. For example, node 3 (1013) may represent a second network accessible via node 2 (1007).

Access point 1003 may enable smart check 1001 to access other nodes on the network. In some embodiments, one or more of nodes 1-6 may be access points. Smart check 1001 may present an identity of the network on an OLED display. The OLED display may include one or more features of OLED layer 200 (shown in FIG. 2). Smart check 1001 may be prompted to authenticate itself to one or more nodes on the network.

Smart check 1001 may display available purchasing instruments 1017 and 1019 stored on smart check 1001. In some embodiments, when prompted by POS terminal 1011, a user may touch the displayed purchasing instrument to transmit sensitive data associated with a purchasing instrument to pay for a purchase.

In some embodiments, before smart check 1001 transmits sensitive data to POS terminal 1011, the user may be required to verify his/her presence by pressing button 1015. In some embodiments, button 1015 may include a biometric scanner, such as a fingerprint reader. In some embodiments, POS terminal 1011 may prompt the user to present a biometric feature using biometric scanner 1009.

For example, utilizing biometric scanner 1009 may avoid the user having to physically access smart check 1001 (e.g., remove it from a wallet). In some embodiments biometric scanner 1009 may be integrated into POS terminal 1011.

In some embodiments, smart check 1001 may be swiped though legacy card reader 1005. Legacy card reader 1005 may read account information stored on magnetic stripe 801 (shown in FIG. 8). To provide more a secure authentication, user may be prompted to depress button 1015 or present a biometric feature using a biometric scanner embedded within button 1015. The transaction may be approved or denied based on a result of the biometric scan.

For example, the node may require verification that the scanned biometric feature matches a known biometric feature associated with the user of smart check 1001. The verification may be performed by smart check 1001 or by a node on the network.

Figure 11:
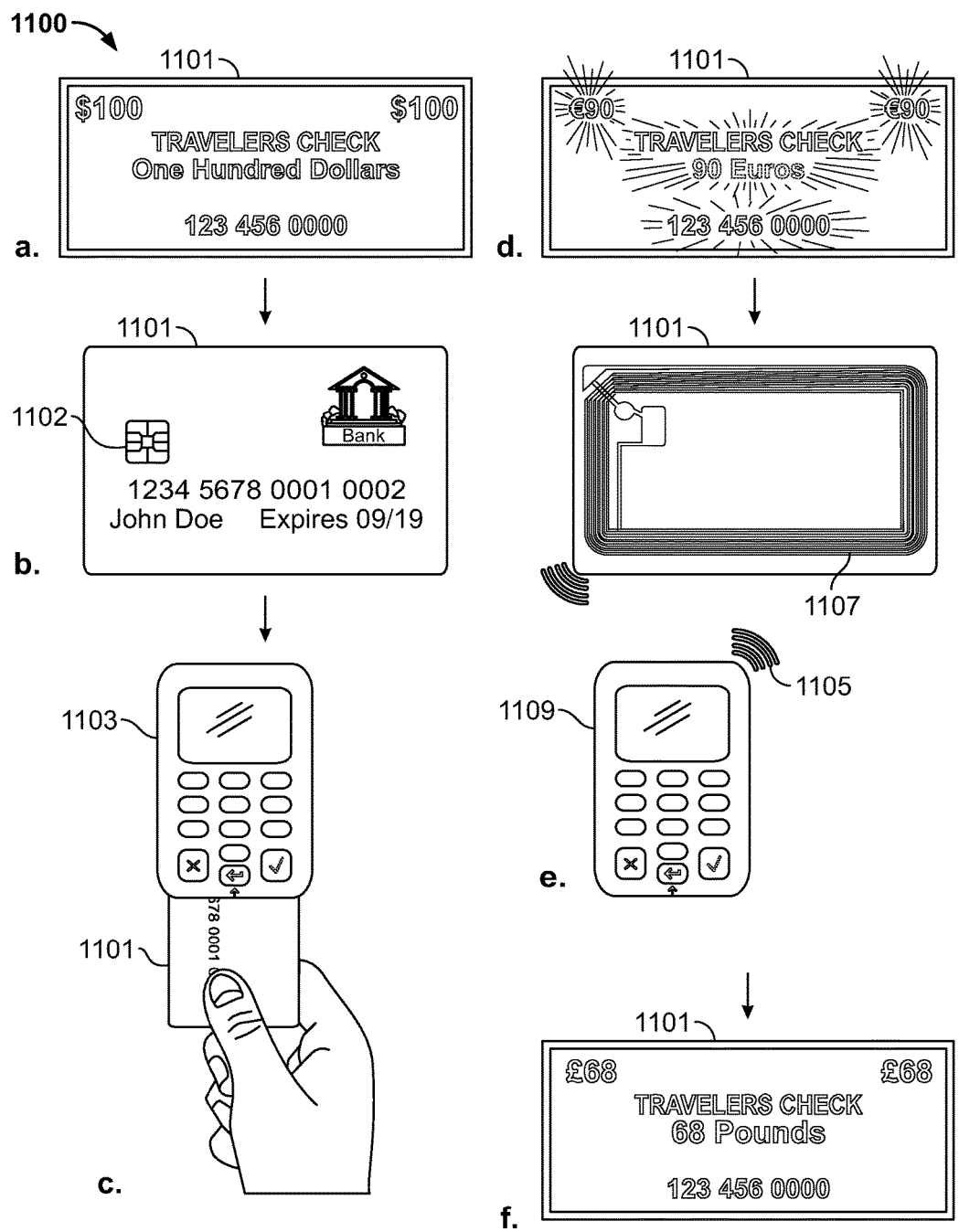
FIG. 11 shows an illustrative scenario and apparatus in accordance with principles of the invention.

FIG. 11 shows illustrative scenario and apparatus 1100. FIG. shows smart check 1101. Smart check 1101 may include one or more features of smart check 100 (shown in FIG. 1). Information may be stored on smart check 1100 and may be displayed using OLED layer 101 (shown in FIG. 1). The information may include sensitive data. Smart check 1101 may include at least two OLED displays.

For example, smart check 1100 may include a first OLED layer as shown in FIG. 4 and a second OLED layer as shown in FIG. 9. A front-face of smart check 1101 may display sensitive data associated with a traveler's check. Back-face of smart check 1101 may display a map showing directions to a desired location.

An OLED display of smart check 1101 may present a representation of sensitive data associated with one or more purchasing instruments stored on smart check 1101 (as shown on smart check 1001, shown in FIG. 10). A user of smart check 1101 may touch one or more of the representations to select sensitive data that may be transmitted by smart check 1101. A user of smart check 1101 may touch one or more of the representations to select sensitive data that may cause smart check 1101 to function as the purchasing instrument associated with the selection. When the user selects a particular purchasing instrument, smart check 1101 may function as if it were the selected purchasing instrument.

In embodiments that include a touch-sensitive OLED display, the user may touch one or more of the displayed representations to make a selection.

At step a, smart check 1101 is shown displaying a value in U.S. dollars. The value may be encrypted and stored within smart check 1101. Step a, also shows that an OLED display of smart check 1101 may be configured to present a traveler's check for an amount of one-hundred U.S. dollars.

At step b, smart check 1101 is shown displaying sensitive data associated with a credit card. The user may toggle between purchasing instruments stored on smart check 1101. Sensitive data associated with the credit card, or other selected purchasing instrument, may be encrypted and stored within smart check 1101. Step b, also shows that an OLED display of smart check 1101 may be configured to display sensitive data associated with the credit card stored within smart check 1101.

Step b also shows that smart check 1101 may include contact 1102. In some embodiments contact 1102 may be an EMV chip. Contact 1102 may penetrate an OLED display of smart check 1101.

Step c shows smart check 1101 being used to make a purchase at POS terminal 1103. When inserted into POS terminal 1103, smart check 1101 may transmit sensitive data. When smart check 1101 is inserted into POS terminal 1103, POS terminal 1103 may power one or more components of smart check 1101. For example, POS terminal may recharge a battery of smart check 1101.

POS terminal 1103 may be located within a geographic region that utilizes the Euro currency. Step d shows that when the user of smart check 1101 activates a purchasing instrument corresponding to the traveler's check, smart check 1101 may display sensitive data associated with the traveler's check in Euros. The sensitive data may include a value stored on the smart check and associated with a traveler's check purchasing instrument. Smart check 1101 may adjust the value based on how much of the value the user has spent or on a currency exchange rate.

Step e, shows that smart check 1101 includes inductive coil 1107. Inductive coil 1107 may be included in a communication circuit such as communication circuit 111 (shown in FIG. 1). Smart check 1101 may utilize inductive coil 1107 to receive and transmit wireless communication signals. Smart check 1101 may utilize inductive coil 1107 to receive wireless signals that power one or more components of smart check 1101.

Wireless signals received by induction coil 1107 may provide location information to smart check 1101. Based on the received location information, smart check 1101 may configure an OLED display to present currency associated with the location.

Smart check 1101 may receive the wireless signals from any suitable network node. For example, step e shows smart check 1101 receiving wireless signal from POS terminal 1109. Smart check 1101 may receive location information from POS terminal 1109. Smart check 1101 may receive location information from POS terminal 1109 even if smart check 1101 is not being used to make a purchase at POS terminal 1109.

Step f shows that after receiving location information from POS terminal 1109, when the user activates a traveler's check (or other purchasing instrument stored on smart check 1101), smart check 1101 may configure its OLED display to present currency associated with the location information (e.g., British pounds).

FIG. 12 shows illustrative scenario 1200. Scenario 1200 also shows user 1201 using smart check 1203 to make a purchase at POS terminal 1205. Scenario 1200 shows user 1207 using smart card 1209 to make a purchase at POS terminal 1211. Scenario 1200 also shows user 1213 using smart check 1205 to make a purchase at POS terminal 1217.

Scenario 1200 shows multiple users (1201, 1207 and 1213) using smart checks (1203, 1209 and 1205) to make a purchase at POS terminals (1205, 1211 and 1217). FIG. 12 shows that smart checks may be configured to communicate wirelessly with POS terminals within a transmission range that does not interfere with smart checks of other users.

In some embodiments, a smart check may be configured to auto-sense for other smart checks. In response to detecting another smart check, a smart check may be configured to utilize a wireless communication protocol that minimizes a risk of interference with the detected smart check. For example, in response to detecting other smart checks, the smart check may only communicate and/or receive sensitive data using a NFC communication protocol.

FIG. 13 shows illustrative smart check 1300. Smart check 1300 is shown displaying QR code 1303. QR code 1303 may include sensitive data. For example, QR code 1303 may include a credit card number, user name or expiration date. QR code 1303 may be read by a network node. The network node may process a transaction based on reading the sensitive data encoded within QR code 1303. Displaying sensitive data in a QR code format may mitigate a risk of exposure of sensitive data stored on smart check 1300.

QR code 1303 may be presented on smart check 1300 using OLED display 1301. FIG. 13 shows that OLED display 1301 covers an entire surface area of a face of smart check 1300. In some embodiments, smart check 1300 may include a second OLED display on an opposing face and/or along a thickness of smart check 1300.

FIG. 13 shows illustrative contacts 1302 and 1304. One or more of contacts 1302 and 1304 may be utilized to transfer power to smart check 1300. For example, one or more of contacts 1302 and 1304 may contact a power source when smart check 1300 is inserted into a POS terminal, ATM or other network node. One or more of contacts 1302 and 1304 may be utilized to transfer information (e.g., sensitive date, location information) between a network node and smart card 1300.

Contacts 1302 and 1304 may connect to one or more other components of an illustrative smart check. For example, contacts 1302 and 1304 may transfer power/information to circuitry layer 205 (shown in FIG. 2), battery layer 105 (shown in FIG. 1), software chip 109 (shown in FIG. 1), communication circuit 111 (shown in FIG. 1) or any suitable component of an illustrative smart check described herein.

FIG. 14 shows illustrative smart check 1400. Smart check 1400 includes face 1401. Smart check 1400 also includes contact 1403. Contact 1430 may extend along one or more sides of face 1401. Contact 1403 may transfer electrical charge to the rechargeable battery when the smart check is inserted into a card reader or other device.

Contact 1403 may also function as a wired connection to a network node. Information, such as a location of the network node, may be transferred to smart check 1400 via contact 1403. Information, such as sensitive data, may be transferred to a network node from smart check 1400 via contact 1403. In some embodiments, sensitive data stored on smart check 1400 may only be transferred via contact 1403.

Some embodiments (not shown) may include a contact that is accessible from face 1401. For example, a smart check may include an EMV chip. The EMV chip may function as a contact.

Figure 15:
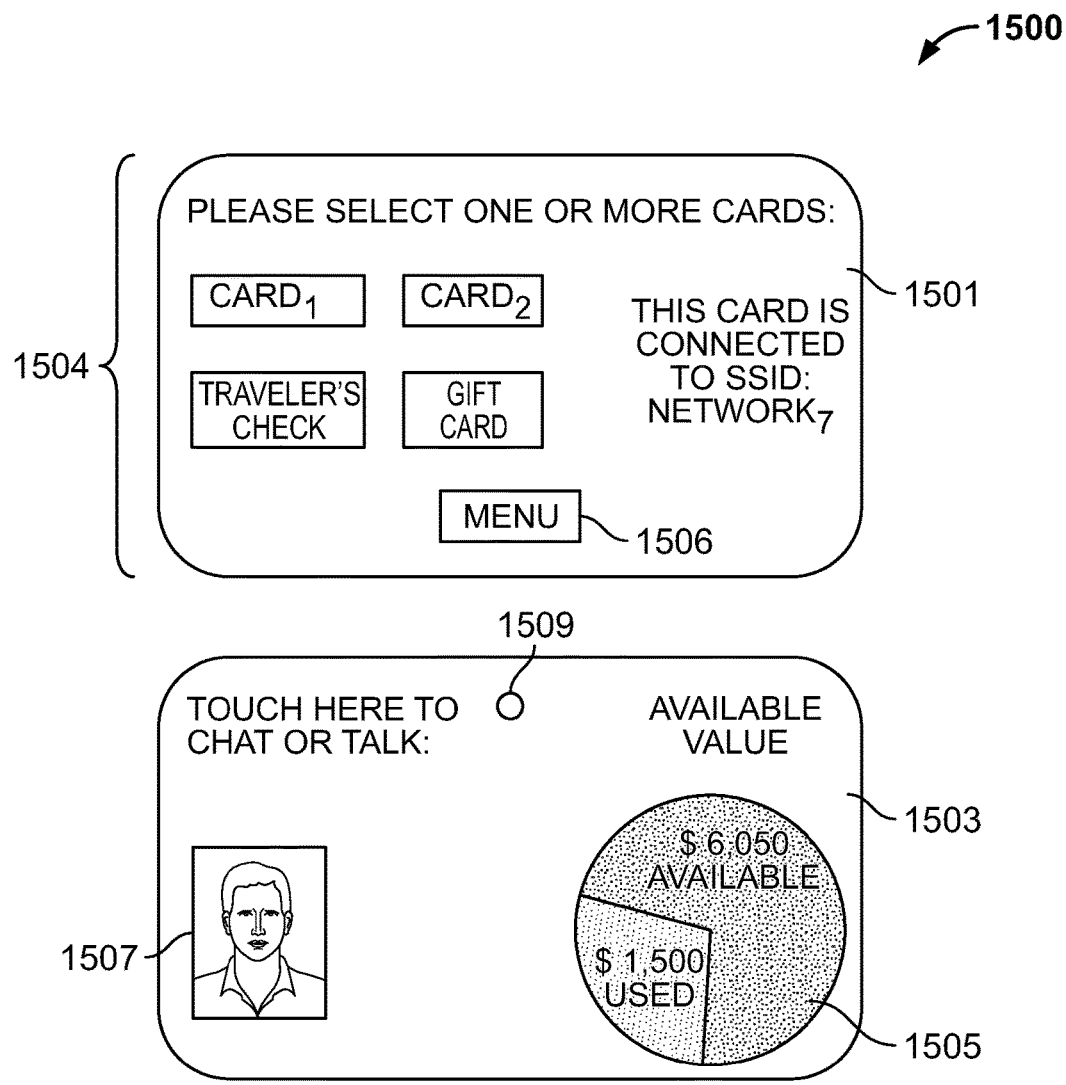
FIG. 15 shows illustrative apparatus in accordance with principles of the invention.

FIG. 15 shows illustrative smart check 1500. Smart check 1500 may include one or more features of smart check 100 (shown in FIG. 1). Information may be stored on smart check 1100 and may be displayed using OLED layer 101 (shown in FIG. 1). The information may include sensitive data. Smart check 1500 includes front-face 1501 and back-face 1503. FIG. 15 shows illustrative information that may be displayed on smart check 1500. Smart check 1500 may utilize OLED display technology to present the information. Smart check 1500 may include at least two OLED displays. For example, smart check 1500 may include a first OLED layer as shown in FIG. 4 and a second OLED layer as shown in FIG. 9.

FIG. 15 shows that front-face 1501 may display an identity of a network that is in communication with smart check 1500. Smart check 1500 is shown displaying that it is connect to a network having a service set identifier "Network 7."

FIG. 15 shows that front-face 1501 may display a representation of sensitive data associated with one or more purchasing instruments stored on smart check 1500. A user of smart check 1500 may touch one or more of the representations to select sensitive data that may be transmitted by smart check 1500. In embodiments that include a touch screen, the user may touch one or more of the displayed representations to make a selection.

Smart check 1500 is shown displaying representations 1104 of credit cards, a traveler's check and a gift card that are stored on smart check 1500. A user of smart check 1500 may select one or more of representations 1504 to complete a purchase. In response to selecting one or more of representations 1504, sensitive data associated with the user selection may be transmitted from smart check 1500.

FIG. 15 also shows that front-face 1501 may provide access to menu option 1506. The menu option 1506 may provide access to settings associated with smart check 1500. Illustrative settings may include requiting all information to be displayed in graphical form, changing a user name/password, updating biometric information, adjusting power settings, turning on/off wireless communication or any suitable setting.

FIG. 15 also shows information displayed on back-face 1503 of smart check 1500. Back face 1503 may also utilize OLED display technology to present information to the user.

Back-face 1503 is shown displaying value information 1505. Smart check 1500 may store a value. For example, the value may be a value of a gift card or traveler's check.

In some embodiments, the value may be changed. For example, a user may replenish a value associated with a traveler's check or gift card. The user may also remove the value from smart check 1500. A network node may instruct smart check 1210 to delete sensitive data stored on smart check 1210. For example, in response to detecting a security breach associated with user of smart check 1500 (or sensitive data stored thereon), the value may be deleted or reduced to zero. A change in the value may be pushed to smart check 1500 over a network (such as via network nodes 1007 or 1013, shown in FIG. 10).

FIG. 15 shows value information 1505. Value information 1505 shows how much of the value has been used. A user of smart check 1500 may be required to provide a biometric feature or other credentials before smart check 1500 presents value information 1105.

Smart check 1500 is also shown displaying video 1507. Smart check 1500 may also include camera 1509. Smart check 1500 may also include a microphone (not shown) and/or a speaker (not shown). In some embodiments, smart check 1500 may connect to a camera, microphone, speaker or other I/O device using a wired or wireless communication protocol. For example, smart check 1500 may connect to an I/O device using NFC communication or via a contact (such as contact 1403, shown in FIG. 14).

A user of smart check 1500 may use camera 1509, a microphone (not shown) and/or a speaker (not shown) to submit a request for assistance to a remote computer. For example, the user may utilize I/O capabilities of smart check 1500 to contact an entity that provided the user with smart check 1500. The user may utilize I/O capabilities of smart check 1500 to request a change to a value stored on smart check 1500.

Information displayed on front-face 1501 may be displayed on back-face 1503. Information displayed on back-face 1503 may be displayed on front-face 1501.

Figure 16:
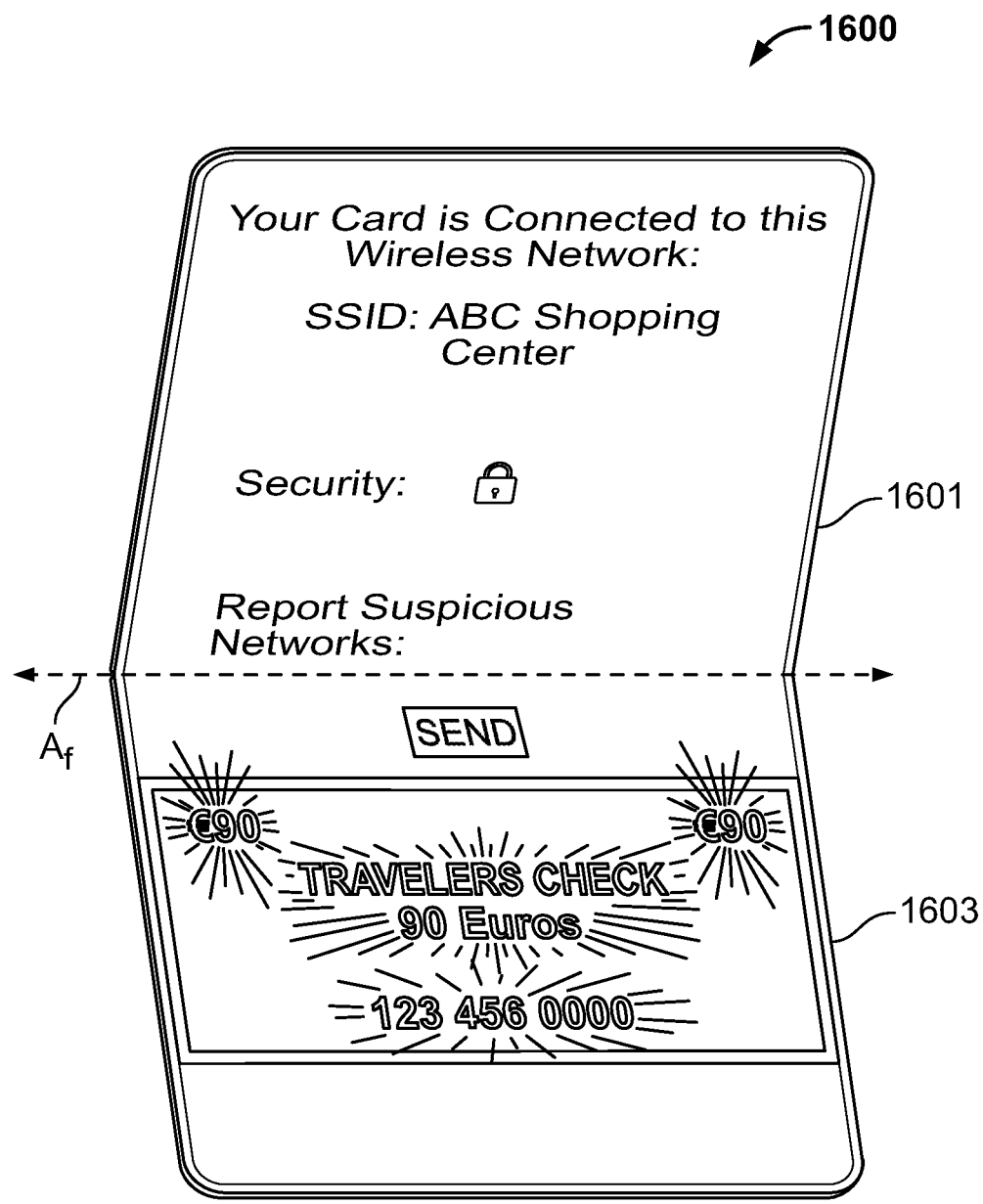
FIG. 16 shows illustrative apparatus in accordance with principles of the invention.

FIG. 16 shows illustrative smart check 1600. Smart check 1600 may include an OLED display. FIG. 16 shows illustrative information that may be presented using the OLED display. FIG. 16 also shows that smart check 1600 and its OLED display may be foldable about axis $A_f$. Axis $A_f$ may define section 1601 and section 1603 of smart check 1600. Section 1601 may include OLED displays on a front-face, back-face and/or thickness of section 1601. Section 1603 may include OLED displays on a front-face, back-face and/or thickness of section 1603.

Smart check 1600 and its OLED display may also be rollable. Smart check 1600 may be foldable such that when folded about axis $A_f$ smart check 1600 is 85.60 mm×53.98 mm×0.8 mm.

Figure 17:
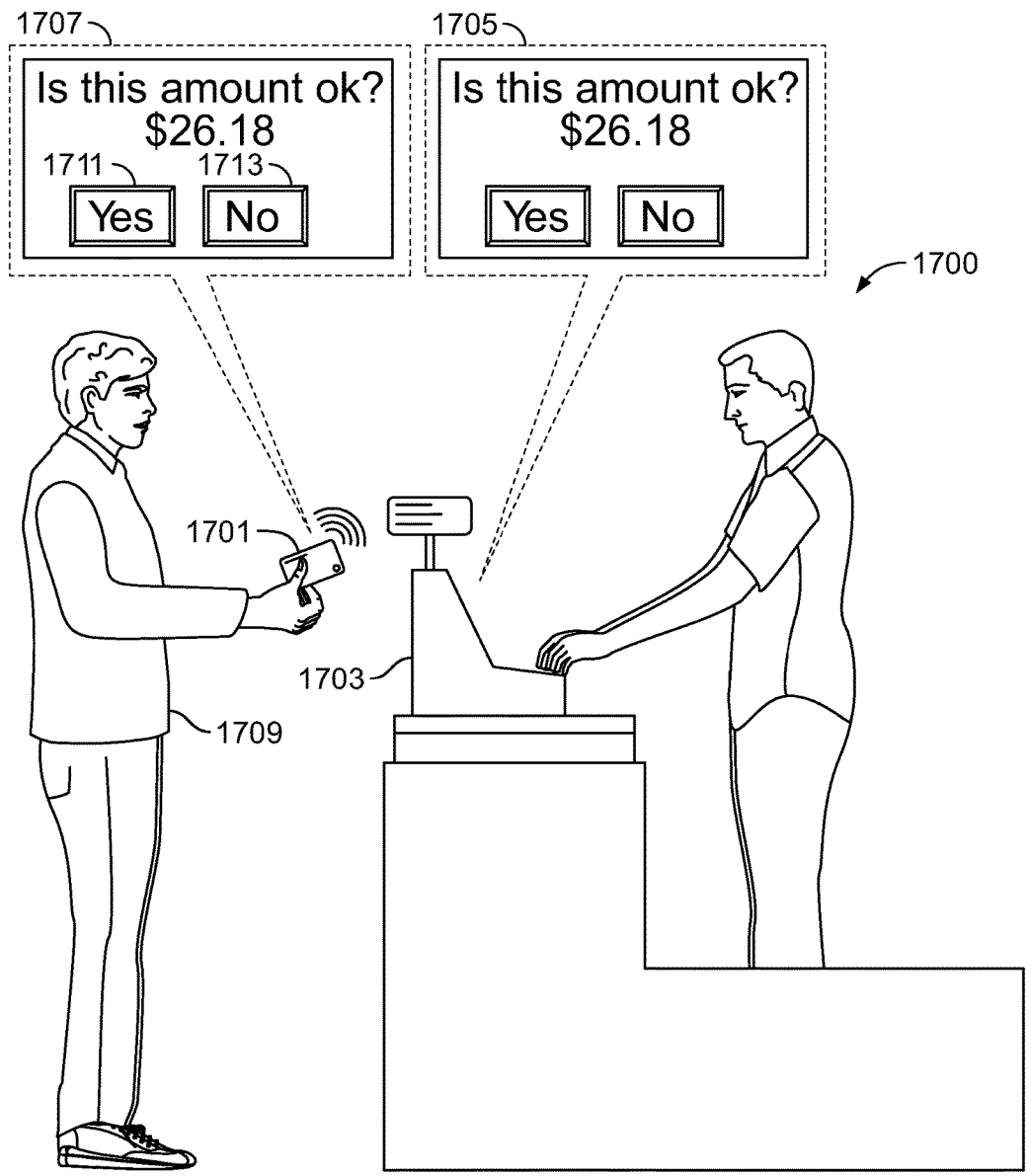
FIG. 17 shows illustrative apparatus in accordance with principles of the invention.

FIG. 17 shows illustrative scenario 1400. Scenario 1700 shows that smart check user 1709 may use sensitive data stored on smart check 1701 to pay for a purchase at POS terminal 1703. Scenario 1700 also shows that in some embodiments, information 1705 displayed at POS terminal 1703 may be mirrored on a display of smart check 1701. For example, smart check 1701 may wirelessly connect to a network that enables access to POS terminal 1703.

User 1709 may select one of illustrative options 1711 or 1713 to complete the purchase. User 1709 may select one of illustrative options 1711 or 1713 by tapping a touch sensitive OLED display of smart check 1701.

Thus, methods and apparatus for providing an OLED travel card have been provided. Persons skilled in the art will appreciate that the present invention can be practiced by other than the described embodiments, which are presented for purposes of illustration rather than of limitation. The present invention is limited only by the claims that follow.

What is claimed is:

1. A smart check comprising:
    a first array of organic light emitting diodes ("OLEDs") forming one or more pixels visible on a first face of the smart check, the first array of OLEDs having a thickness that is not greater than 0.25 mm and having a surface area that is at least 90% of 85.60 mm×53.98 mm;
    a second array of OLEDs forming one or more pixels visible on a second face of the smart check, the second array of OLEDs having a thickness that is not greater than 0.25 mm and having a surface area that is at least 90% of 85.60 mm×53.98 mm;
    a rechargeable battery that is not greater than 0.8 mm thick;
    a contact that extends along one or more sides of the smart check, each side of the smart check having a thickness that is not greater than 0.8 mm, the contact for transferring electrical charge to the rechargeable battery when the smart check is inserted into a card reader; and
    a processor circuit comprising a non transitory memory and a processor, the processor circuit having a thickness that is not greater than 0.25 mm and the non-transitory memory storing an encrypted value in a first currency;
    wherein, in operation, when the smart check is inserted into the card reader and electrical charge is transferred from the card reader to the rechargeable battery via the contact:
    a geographic location associated with the card reader is transferred to the non-transitory memory;
    second currency information associated with the card reader is transferred to the non-transitory memory;
    the processor circuit converts the encrypted value into the second currency; and
    the array of OLEDs is configured to present the location and the second currency on the first face of the smart check.

2. The smart check of claim 1 further comprising a communication circuit, wherein in operation:
    the processor circuit instructs the communication circuit to:
    scan for a wireless network;
    connect to a node on the wireless network; and
    obtain geographic location information associated with the node;
    the processor circuit converts the encrypted value into a third currency associated with the geographic location information received from the node; and
    the array of OLEDs is configured to present the third currency on the first face of the smart check.

3. The smart check of claim 2 wherein, when the electrical charge is being transferred via the contact, the processor circuit powers-off the communication circuit.

4. The smart check of claim 2 wherein the communication circuit communicates with the node using a near field communication ("NFC") protocol.

5. The smart check of claim 2 wherein the communication circuit is configured to receive and transmit wireless signals within a range that is less than 50 cm.

6. The smart check of claim 2 wherein the node is a point-of-sale ("POS") terminal.

7. The smart check of claim 1 wherein the smart check is not greater than 86 mm×54 mm×0.8 mm.

8. A smart check comprising:
    an array of organic light emitting diodes ("OLEDs") forming one or more pixels of a face of the smart check, the array of OLEDs having a thickness that is not greater than 0.25 mm and having a surface area that is at least 90% of 85.60 mm×53.98 mm;
    a rechargeable battery that is not greater than 0.8 mm thick;
    a contact that extends along one or more sides of the smart check, each side of the smart check having a thickness that is not greater than 0.8 mm;
    a first inductive charging coil embedded in the smart check, the first inductive charging coil configured to transfer electrical charge to the rechargeable battery when the smart check is within a pre-determined range of a second inductive charging coil of a card reader; and
    a processor circuit comprising a non transitory memory and a processor, the processor circuit having a thickness that is not greater than 0.25 mm;

wherein in operation, when the first inductive charging coil is within the pre-determined range of the second inductive charging coil:
    the rechargeable battery is recharged;
    location information associated with the card reader is transferred to the non-transitory memory via communication between the first and second inductive charging coils; and
    the array of OLEDs is configured to present, on the face of the smart check, a currency associated with the location information received from the card reader;
wherein, sensitive data stored on the smart check is only be transferred via the contact; and
wherein the sensitive data includes at least one of:
    a unique number associated with the smart check;
    a name of the smart check holder;
    an expiration date associated with the unique number;
    an amount of currency; and
    a card verification value ("CVV").

9. The smart check of claim 8 wherein the predetermined range is not greater than 50 cm.

10. The smart check of claim 8 wherein the first inductive charging coil is configured to receive wireless communication signals transmitted by the second inductive charging coil.

11. The smart check of claim 10 wherein the wireless communication signals conform to a protocol for implementing near-field communication ("NFC").

12. The smart check of claim 10 wherein the wireless communication signals conform to a protocol for implementing Wi-Fi communication.

13. The smart check of claim 8 wherein the processor circuit is configured to:
    generate a quick response ("QR") code based on one or more executable instructions received from the second inductive charging coil; and
    configure the array of OLEDs to present the QR code for a pre-determined time period.

14. The smart check of claim 8 wherein when the first inductive charging coil is powered by the battery and not by the second inductive charging coil, the processor circuit instructs:
    the first inductive charging coil to:
        scan for a wireless network;
        connect to a node on the wireless network; and
        obtain location information associated with the node; and
    the array of OLEDs to present a currency associated with the location information associated with the node.

15. The smart check of claim 14 wherein, when the first inductive charging coil connects to the node, the processor circuit instructs the array of OLEDs to display identification of the wireless network on a pre-determined surface area of the array of OLEDs.

16. The smart check of claim 14 wherein the node is a mobile device.

17. A smart check comprising:
    an array of organic light emitting diodes ("OLEDs") forming one or more pixels, the array of OLEDs having a thickness that is not greater than 0.25 mm and having a surface area that is at least 90% of 85.60 mm×53.98 mm;
    a contact that extends along one or more sides of the smart check, each side of the smart check having a thickness that is not greater than 0.8 mm;
    a wireless communication circuit having a thickness that is not greater than 0.8 mm; and
    a processor circuit comprising a non transitory memory and a processor, the processor circuit having a thickness that is not greater than 0.25 mm; and
wherein in operation:
    the wireless communication circuit is configured to receive a communication signal that provides power to the smart check;
    in response to the receiving power via the wireless communication circuit, the processor circuit instructs the wireless communication circuit to:
        scan for a wireless network and connect to a node on the wireless network; and
        transmit an encrypted authentication key stored in the non-transitory memory to the node and thereby access location information associated with the node; and
    in response to receiving the location information, the processor circuit instructs the array of OLEDs to present:
        a currency associated with the location information; and
        an exchange rate for converting a default currency associated with the smart check into the currency associated with the location;
wherein, sensitive data stored on the smart check is only be transferred via the contact; and
wherein the sensitive data includes at least one of:
    a unique number associated with the smart check;
    a name of the smart check holder;
    an expiration date associated with the unique number;
    an amount of currency; and
    a card verification value ("CVV").

18. The smart check of claim 17 wherein the node on the wireless network is a point-of-sale ("POS") terminal.

19. The smart check of claim 18 wherein, the when the wireless communication circuit is connected to the node, the processor circuit instructs the array of OLEDs to mirror information displayed on the POS terminal.

20. The smart check of claim 17 wherein the wireless communication circuit has a maximum range of 50 cm.

21. The smart check of claim 17 wherein, when the wireless communication circuit is connected to the node, the processor circuit instructs the array of OLEDs to present identification of the wireless network on a pre-determined surface area of the array of OLEDs.

* * * * *